(12) United States Patent
Nakamura

(10) Patent No.: US 9,276,913 B2
(45) Date of Patent: *Mar. 1, 2016

(54) TRANSMISSION/RECEPTION SYSTEM, TRANSMISSION DEVICE, RECEPTION DEVICE, AUTHENTICATION DEVICE, USER EQUIPMENT, METHOD EXECUTED USING THESE, AND PROGRAM

(71) Applicant: N-CRYPT LAB, Inc., Mie (JP)

(72) Inventor: Takatoshi Nakamura, Mie (JP)

(73) Assignee: N-CRYPT LAB, Inc., Mie (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,884

(22) Filed: Nov. 10, 2014

(65) Prior Publication Data

US 2015/0067324 A1    Mar. 5, 2015

Related U.S. Application Data

(60) Division of application No. 12/897,731, filed on Oct. 4, 2010, now Pat. No. 8,885,826, which is a continuation of application No. PCT/JP2009/057407, filed on Apr. 6, 2009.

(51) Int. Cl.
*H04L 29/06* (2006.01)
*H04L 9/14* (2006.01)

(52) U.S. Cl.
CPC .............. *H04L 63/0428* (2013.01); *H04L 9/14* (2013.01); *H04L 63/0838* (2013.01)

(58) Field of Classification Search
CPC .... H04L 63/0428; H04L 9/14; H04L 63/0838
USPC .......................................................... 380/255
See application file for complete search history.

(56) References Cited

U.S. PATENT DOCUMENTS

| | | | | |
|---|---|---|---|---|
| 7,627,752 | B2* | 12/2009 | Sakaguchi | H04L 63/0428 709/236 |
| 2004/0250089 | A1* | 12/2004 | Ochi | G06F 21/10 713/189 |
| 2006/0018481 | A1* | 1/2006 | Nagano | H04L 9/3271 380/270 |
| 2007/0223037 | A1* | 9/2007 | Sasaki | G06F 17/30864 358/1.16 |
| 2008/0299966 | A1* | 12/2008 | Masuda | H04L 63/08 455/432.1 |

* cited by examiner

*Primary Examiner* — Izunna Okeke
*Assistant Examiner* — Sakinah Taylor
(74) *Attorney, Agent, or Firm* — Martine Penilla Group, LLP

(57) ABSTRACT

An encryption technique in which a transmission device and a reception device use solutions generated such that those generated in the same order are assumed to be the same is improved so as to enhance versatility without undermining security. An initial solution respectively used by two communication devices involved in communication in order to generate solutions is sent from one communicating device to the other. Both communication devices generate a mutually agreed-upon number of solutions from the initial solution and set the last solution among the generated solutions as a new initial solution, and using solutions generated based on the new initial solution, the transmission device performs encryption while the reception device performs decryption.

9 Claims, 10 Drawing Sheets

|  | ID | INITIAL SOLUTION | |
|---|---|---|---|
| COMMUNICATION DEVICE 1-1 | 6A0310Yf234 | $X_{101}$ | $X_{102}$ |
| COMMUNICATION DEVICE 1-2 | 08B30dQ5345 | $X_{201}$ | $X_{202}$ |
| COMMUNICATION DEVICE 1-3 | z90C2345r78 | $X_{301}$ | $X_{302}$ |
| ⋮ | ⋮ | ⋮ | ⋮ |
| COMMUNICATION DEVICE 1-N | 3e00D01wG01 | $X_{N01}$ | $X_{N02}$ |

FIG. 9

TRANSMISSION/RECEPTION SYSTEM, TRANSMISSION DEVICE, RECEPTION DEVICE, AUTHENTICATION DEVICE, USER EQUIPMENT, METHOD EXECUTED USING THESE, AND PROGRAM

CLAIM OF PRIORITY TO RELATED APPLICATION

The present application is a Divisional application of U.S. patent application Ser. No. 12/897,731, filed on Oct. 4, 2010, entitled "TRANSMISSION/RECEPTION SYSTEM, TRANSMISSION DEVICE, RECEPTION DEVICE, AUTHENTICATION DEVICE, USER EQUIPMENT, METHOD EXECUTED USING THESE, AND PROGRAM", which claims priority under 35 U.S.C. §§120 and 365(c) as a continuation application of prior International Japanese Application No. PCT/JP2009/057407, which was filed on Apr. 6, 2009, and which was published under International Publication No. WO 2009/123366 A1 on Oct. 8, 2009, all of which are incorporated herein by reference.

TECHNICAL FIELD

The present invention relates to a technique for encrypting and transmitting/receiving predetermined data.

BACKGROUND ART

A technique for transmitting and receiving data via a predetermined network such as the Internet is widely used in fields such as the Internet, electronic mail, and IP telephony. Data to be transmitted and received via a network may include programs and data of contents such as moving images.

During transmission/reception of data, there is a risk that eavesdropping of data by a third party may occur between a transmission device that transmits the data and a reception device that receives the data. Encryption techniques are widely used in order to prevent such occurrences when transmitting/receiving data.

While there are various techniques for encryption, one of such techniques uses a one-time password.

A one-time password is often used for authentication. A one-time password is generally realized using a tool known as a token that generates a personal identification number or other information. A token sometimes generates the information described above in a time-dependent manner and sometimes generates the information so that the information is dependent on an order in which the information had been generated. In any case, an authentication device and a token are adapted to generate the same information. The user sends the aforementioned information generated by the user's own token to the authentication device. The authentication device validates a user by collating information generated by the device itself with the information received from the user.

Such a technique involving a one-time password can be applied to encrypted communication by having two transmission devices generate common information, and having the transmitting side use the common information for encrypting data to become an object of transmission and having the receiving side use the common information for decrypting received encrypted data. While the aforementioned common information can be used as, for example, a part of a key or an algorithm for encrypting or decrypting data, as information for newly generating a key or an algorithm, or for specifying one from a plurality of keys or algorithms, since the key or algorithm is never transmitted between the two communication devices, a relatively high encryption strength can be achieved.

A similar technique has already been proposed by the present inventor.

The technique can be described as follows.

The encrypting technique proposed by the present inventor is adapted such that a transmission device and a reception device include solution generating means that consecutively generates, based on an initial solution that is predetermined data, solutions uniquely determined by the initial solution. The transmission device is adapted to use a solution generated by the solution generating means when encrypting and converting data to be transmitted into encrypted data, and the reception device is adapted to use a solution generated by the solution generating means when decrypting received encrypted data to restore the original data. The aforementioned solution is to be appropriately used during encryption and decryption (for example, a solution may be used as one of a key when performing encryption and decryption, a solution for generating at least one of a key or an algorithm to be used when performing encryption and decryption, and a solution for selecting an appropriate key or algorithm from a plurality of already existing keys or algorithms). In any case, solutions generated by the transmission device and the reception device are to be the same when comparing solutions respectively generated in the same order. Consequently, since the reception device is now capable of reproducing a key and an algorithm used by the transmission device when performing encryption by the transmission device using the same solution that had been used when performing encryption, encrypted data generated at the transmission device by encrypting predetermined data can be decrypted even when the transmission device provides no information related to a solution, a key, and an algorithm used by the transmission device during encryption.

The aforementioned technique proposed by the present inventor is achieved by having the transmission device and the reception device generate solutions such that those generated in the same order become the same. To this end, means for generating the same solution at both the transmission device and the reception device is required. The present inventor has solved this issue by providing, in advance, the transmission device and the reception device with a particular solution (being a first solution, this solution is to be referred to as an initial solution in the present application). Specifically, the transmission device and the reception device are adapted to generate one solution after another based on a common initial solution provided in advance (a plurality of initial solutions may be provided) by performing processing in which a second solution is created using the initial solution, a third solution is created using the second and antecedent solutions, a fourth solution is created using the third and antecedent solutions, and so on.

Although the aforementioned technique proposed by the present inventor enables a method of performing encryption by the transmission device to be varied (for example, keys and algorithms can be varied), the technique is highly advantageous in that information necessary for identifying a solution, a key, or an algorithm used by the transmission device need not be exchanged between the transmission device and the reception device. In other words, a cipher created by the aforementioned technique is hard to break.

Since the aforementioned technique is based on the premise that a common initial solution is provided in advance to a transmission device that performs encryption and a reception device that performs decryption, the technique is suitable for one-on-one communication between the transmission device and the reception device. However, when the transmission device and the reception device are specified or restricted from the start, the aforementioned technique can be applied even if one of or both of the transmission device and the reception device exists in plurality.

However, it is difficult to apply the aforementioned technique when, for example, at least one of the transmission device and the reception device exists in plurality and the transmission device and the reception device are not specified. It is similarly difficult to have the transmission device and the reception device share an initial solution in advance when a transmission device or a reception device is increased. While the transmission device and the reception device are required to possess a common initial solution upon performing encryption and decryption (this requirement may be achieved by gaining knowledge of an initial solution in the possession of the other party in some way), at present, there are no suitable techniques for fulfilling this requirement.

[Patent Literature 1] Japanese Patent Laid-Open No. 2003-249929

[Patent Literature 2] Japanese Patent Laid-Open No. 2006-253745

[Patent Literature 3] Japanese Patent Laid-Open No. 2006-253746

[Patent Literature 4] Japanese Patent Laid-Open No. 2007-013506

It is an object of the present invention to enhance versatility, without undermining security, of an encryption technique in which a transmission device and a reception device use solutions generated such that those generated in the same order are to become the same.

SUMMARY OF INVENTION

In order to achieve the object described above, the present inventor proposes a first invention and a second invention described below.

The first invention according to the present application is as follows.

The first invention is a transmission/reception system including: a transmission device capable of transmitting, via a predetermined network, encrypted data created by encrypting transmission object data that is data to become an object of transmission; and a reception device capable of receiving the encrypted data from the transmission device via the network.

In addition, the transmission device includes: transmitting-side solution generating means that consecutively generates, based on an initial solution that is predetermined data, solutions dependent on the initial solution and uniquely determined by the initial solution; encrypting means that uses the solutions generated by the transmitting-side solution generating means to encrypt the transmission object data to create encrypted data; and transmitting-side communicating means that communicates with the reception device via the network.

Furthermore, the reception device includes: receiving-side solution generating means that consecutively generate, based on an initial solution that is predetermined data, solutions dependent on the initial solution and uniquely determined by the initial solution, and adapted to generate the same solutions as the transmitting-side solution generating means if it uses the same initial solution as used by the transmitting-side solution generating means; decrypting means that uses the solutions generated by the receiving-side solution generating means to decrypt the encrypted data that is encrypted by the transmission device; and receiving-side communicating means that communicates with the transmission device via the network.

The transmission device and the reception device are adapted such that: when transmission/reception of the encrypted data is performed, one of the transmission device and the reception device transmits data to become the initial solution to the other of the transmission device and the reception device; the one of the transmission device and the reception device generates solutions at transmitting-side solution generating means thereof or receiving-side solution generating means thereof using the transmitted data as an initial solution, and the other of the transmission device and the reception device generates solutions at transmitting-side solution generating means thereof or receiving-side solution generating means thereof using the received data as an initial solution; the transmitting-side solution generating means and the receiving-side solution generating means generate a mutually agreed-upon predetermined number of solutions, and subsequently generate solutions using a last solution among the predetermined number of solutions as a new initial solution; and the encrypting means is adapted to encrypt the transmission object data using the solutions generated by the transmitting-side solution generating means based on the new initial solution, and the decrypting means is adapted to decrypt the encrypted data using the solutions generated by the receiving-side solution generating means based on the new initial solution.

The transmission/reception system is adapted such that data to become an initial solution is to be sent from one of the transmission device and the reception device to the other. By having data to become an initial solution sent from one of the transmission device and the reception device to the other, the present system enables an initial solution to be shared among unspecified transmission devices and reception devices which had been conventionally difficult to achieve. Moreover, instead of being initial solution data for generating solutions to be used when the transmission device and the reception device encrypts or decrypts encrypted data to be transmitted/received, the initial solution data sent from one of the transmission device and the reception device to the other is initial solution data for generating an initial solution for generating solutions to be used when the transmission device and the reception device encrypts or decrypts encrypted data to be transmitted/received. By generating a previously and mutually agreed-upon number of solutions based on an initial solution transmitted/received between the transmission device and the reception device, the transmission device and the reception device are to obtain an initial solution to be used for generating solutions used when encrypting transmission object data or decrypting encrypted data. In other words, with the transmission/reception system, since an initial solution for generating solutions to be used when encrypting transmission object data or decrypting encrypted data is not transmitted/received between the transmission device and the reception device and a third party has no way of knowing which place in the order of the generated solutions is to be used by the transmission device and the reception device as an initial solution for generating solutions to be used when encrypting transmission object data or decrypting encrypted data, a high encryption strength can be achieved.

Whichever transmits the data to become the initial solution among the transmission device and the reception device included in the transmission/reception system according to the first invention may include means for varying the data to become the initial solution according to a predetermined rule at a predetermined timing. Encryption strength can be further increased by varying data to become the initial solution which is sent from one of the transmission device and the reception device to the other.

As described above, the transmitting-side solution generating means and the receiving-side solution generating means of the transmission device and the reception device included in the transmission/reception system according to the first invention are adapted to generate a mutually agreed-upon predetermined number of solutions based on the received initial solution, and to subsequently generate solutions to be used when encrypting transmission object data or decrypting encrypted data using a last solution among the predetermined number of solutions as a new initial solution. In this case, the "predetermined number" with respect to which of the solutions is to be used as an initial solution need not necessarily be fixed and can alternatively be varied on the condition that the "predetermined number" is the same between the transmission device and the reception device. For example, the "predetermined number" described above may be varied even when data is not exchanged between the transmission device and the reception device if information that can be acquired even if separated such as a time and date of transmission/reception of data between the transmission device and the reception device is to be used as a basis.

As described above, the transmitting-side solution generating means and the receiving-side solution generating means of the transmission device and the reception device included in the transmission/reception system according to the first invention are adapted to generate solutions to be used when encrypting transmission object data or decrypting encrypted data. In this case, one or a plurality of solutions may respectively be used for encrypting transmission object data and decrypting encrypted data. If a plurality of solutions is to be used, the transmission/reception system according to the present invention can be adapted as described below. That is, the encrypting means may be adapted to divide the transmission object data into pieces having a predetermined bit length to create divisional transmission object data and subsequently sequentially encrypt the respective pieces of divisional transmission object data using different solutions generated by the transmitting-side solution generating means, and the decrypting means may be adapted to divide the encrypted data into pieces having a predetermined bit length to create divisional encrypted data and subsequently sequentially decrypt the respective pieces of divisional encrypted data using different solutions generated by the receiving-side solution generating means. In this case, a new solution is to be used every time divisional transmission object data is encrypted and every time divisional encrypted data is decrypted.

The present invention proposes the transmission device to be included in the transmission/reception system described above as one of the first inventions according to the present application. The transmission device may either be adapted to transmit the data to become the initial solution to the reception device or to receive the data to become the initial solution from the reception device.

A same operational effect as the former transmission device can be achieved by the following method.

The method is a method to be executed by a transmission device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the reception device adapted to include: receiving-side solution generating means for consecutively generating, based on an initial solution that is predetermined data, solutions dependent on the initial solution and uniquely determined by the initial solution; decrypting means that uses the solutions generated by the receiving-side solution generating means to decrypt the encrypted data to create transmission object data; receiving-side communicating means for communicating with the transmission device via the network; and means for receiving data to become the initial solution from the transmission device when transmission/reception of the encrypted data is performed, the receiving-side solution generating means being adapted to generate a predetermined number of solutions mutually agreed-upon with the transmission device and to generate a solution using a last solution among the predetermined number of solutions as a new initial solution when data to become the initial solution is received from the transmission device, and the decrypting means being adapted to decrypt the encrypted data using a solution generated by the receiving-side solution generating means using a last solution among the predetermined number of solutions as a new initial solution, wherein the transmission device includes control means that consecutively generate, based on an initial solution that is predetermined data, solutions dependent on the initial solution and uniquely determined by the initial solution, and adapted to be capable of generating the same solutions as the receiving-side solution generating means if it uses the same initial solution that is used by the receiving-side solution generating means.

In addition, the method includes processes in which the control means: transmits the data to become the initial solution to the reception device; transmits the encrypted data to the reception device; generates a predetermined number, which had been agreed upon with the reception device, of solutions using the data to become the initial solution transmitted to the reception device as an initial solution; generates a solution using a last solution among the predetermined number of solutions as a new initial solution; and encrypts the transmission object data using the solution generated using the last solution among the predetermined number of solutions as a new initial solution.

The former transmission device can be realized with, for example, a computer program described below. The use of the computer program enables the same operational effect as the former transmission device to be achieved even with a general-purpose computer (for example, a personal computer or a mobile phone).

The computer program is a computer program that causes control means of a transmission device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the reception device adapted to include: receiving-side solution generating means for consecutively generating, based on an initial solution that is predetermined data, solutions dependent on the initial solution and uniquely determined by the initial solution; decrypting means that uses the solutions generated by the receiving-side solution generating means to decrypt the encrypted data to create transmission object data; receiving-side communicating means for communicating with the transmission device via the network; and means for receiving data to become the initial solution from the transmission device when transmission/reception of the encrypted data is performed, the receiving-side solution generating means being adapted to generate a predetermined number of solutions mutually agreed-upon with the transmission device and to generate a solution using a last solution among the predetermined number of solutions as a new initial solution when data to become the initial solution is received from the transmission device, and the decrypting means being adapted to decrypt the encrypted data using a solution generated by the receiving-side solution generating means using a last solution among the predetermined number of solutions as a new initial solution, the transmission device including the control means that consecutively generate, based on an initial solution that is predetermined data, solutions dependent on the initial solution and uniquely determined by the initial solution, and adapted to be capable of generating the same solutions as the receiving-side solution generating means if it uses the same initial solution that is used by the receiving-side solution generating means, to execute the processes of: transmitting the data to become the initial solution to the reception device; transmitting the encrypted data to the reception device; generating a predetermined number, which had been agreed upon with the reception device, of solutions using the data to become the initial solution transmitted to the reception device as an initial solution; generating a solution using a last solution among the predetermined number of solutions as a new initial solution; and encrypting the transmission object data using the solution generated using the last solution among the predetermined number of solutions as a new initial solution.

A same operational effect as the latter transmission device can be achieved by the following method.

The method is a method to be executed by a transmission device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the reception device adapted to include: receiving-side solution generating means for consecutively generating, based on an initial solution that is predetermined data, solutions dependent on the initial solution and uniquely determined by the initial solution; decrypting means that uses the solutions generated by the receiving-side solution generating means to decrypt the encrypted data to create transmission object data; receiving-side communicating means for communicating with the transmission device via the network; and means for transmitting data to become the initial solution to the transmission device when transmission/reception of the encrypted data is performed, the receiving-side solution generating means being adapted to generate a predetermined number of solutions mutually agreed-upon with the transmission device and to generate a solution using a last solution among the predetermined number of solutions as a new initial solution when data to become the initial solution is transmitted to the transmission device, and the decrypting means being adapted to decrypt the encrypted data using a solution generated by the receiving-side solution generating means using a last solution among the predetermined number of solutions as a new initial solution, wherein the transmission device includes control means that consecutively generates, based on an initial solution that is predetermined data, solutions dependent on the initial solution and uniquely determined by the initial solution, and adapted to be capable of generating the same solutions as the receiving-side solution generating means if it uses the same initial solution that is used by the receiving-side solution generating means.

In addition, the method includes processes in which the control means: receives the data to become the initial solution from the reception device; transmits the encrypted data to the transmission device; generates a predetermined number, which had been agreed upon with the reception device, of solutions using the data to become the initial solution received from the reception device as an initial solution; generates a solution using a last solution among the predetermined number of solutions as a new initial solution; and encrypts the transmission object data using the solution generated using the last solution among the predetermined number of solutions as a new initial solution.

The latter transmission device can be realized with, for example, a computer program described below. The use of the computer program enables the same operational effect as the latter transmission device to be achieved even with a general-purpose computer (for example, a personal computer or a mobile phone).

The computer program is a computer program that causes control means of a transmission device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the reception device adapted to include: receiving-side solution generating means for consecutively generating, based on an initial solution that is predetermined data, solutions dependent on the initial solution and uniquely determined by the initial solution; decrypting means that uses the solutions generated by the receiving-side solution generating means to decrypt the encrypted data to create transmission object data; receiving-side communicating means for communicating with the transmission device via the network; and means for transmitting data to become the initial solution to the transmission device when transmission/reception of the encrypted data is performed, the receiving-side solution generating means being adapted to generate a predetermined number of solutions mutually agreed-upon with the transmission device and to generate a solution using a last solution among the predetermined number of solutions as a new initial solution when data to become the initial solution is transmitted to the transmission device, and the decrypting means being adapted to decrypt the encrypted data using a solution generated by the receiving-side solution generating means using a last solution among the predetermined number of solutions as a new initial solution, the transmission device including the control means that consecutively generates, based on an initial solution that is predetermined data, solutions dependent on the initial solution and uniquely determined by the initial solution, and adapted to be capable of generating the same solutions as the receiving-side solution generating means if it uses the same initial solution that is used by the receiving-side solution generating means, to execute the processes of: receiving the data to become the initial solution from the reception device; transmitting the encrypted data to the transmission device; generating a predetermined number, which had been agreed upon with the reception device, of solutions using the data to become the initial solution received from the reception device as an initial solution; generating a solution using a last solution among the predetermined number of solutions as a new initial solution; and encrypting the transmission object data using the solution generated using the last solution among the predetermined number of solutions as a new initial solution.

The present inventor proposes the reception device to be included in the transmission/reception system described above as one of the first inventions according to the present application. The reception device may either be adapted to receive the data to become the initial solution from the transmission device or to transmit the data to become the initial solution to the transmission device.

A same operational effect as the former reception device can be achieved by the following method.

The method is a method to be executed by a reception device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the transmission device adapted to include: transmitting-side solution generating means for consecutively generating, based on an initial solution that is predetermined data, solutions dependent on the initial solution and uniquely determined by the initial solution; encrypting means that uses the solutions generated by the transmitting-side solution generating means to encrypt the transmission object data to create encrypted data; transmitting-side communicating means for communicating with the reception device via the network; and means for transmitting data to become the initial solution to the reception device when transmission/reception of the encrypted data is performed, the transmitting-side solution generating means being adapted to generate a predetermined number of solutions mutually agreed-upon with the reception device and to generate a solution using a last solution among the predetermined number of solutions as a new initial solution when data to become the initial solution is transmitted to the reception device, and the encrypting means being adapted to encrypt the transmission object data using a solution generated by the transmitting-side solution generating means using a last solution among the predetermined number of solutions as a new initial solution, wherein the reception device includes control means that consecutively generates, based on an initial solution that is predetermined data, solutions dependent on the initial solution and uniquely determined by the initial solution, and adapted to be capable of generating the same solutions as the transmitting-side solution generating means if it uses the same initial solution that is used by the transmitting-side solution generating means.

In addition, the method includes processes in which the control means: receives the data to become the initial solution from the transmission device; receives the encrypted data from the transmission device; generates a predetermined number, which had been agreed upon with the transmission device, of solutions using the data to become the initial solution received from the transmission device as an initial solution; generates a solution using a last solution among the predetermined number of solutions as a new initial solution; and decrypts the encrypted data using the solution generated using the last solution among the predetermined number of solutions as a new initial solution.

The former reception device can be realized with, for example, a computer program described below. The use of the computer program enables the same operational effect as the former reception device to be achieved even with a general-purpose computer (for example, a personal computer or a mobile phone).

The computer program is a computer program that causes control means of a reception device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the transmission device adapted to include: transmitting-side solution generating means for consecutively generating, based on an initial solution that is predetermined data, solutions dependent on the initial solution and uniquely determined by the initial solution; encrypting means that uses the solutions generated by the transmitting-side solution generating means to encrypt the transmission object data to create encrypted object data; transmitting-side communicating means for communicating with the reception device via the network; and means for transmitting data to become the initial solution to the transmission device when transmission/reception of the encrypted data is performed, the transmitting-side solution generating means being adapted to generate a predetermined number of solutions mutually agreed-upon with the reception device and to generate a solution using a last solution among the predetermined number of solutions as a new initial solution when data to become the initial solution is transmitted to the reception device, and the encrypting means being adapted to encrypt the transmission object data using a solution generated by the transmitting-side solution generating means using a last solution among the predetermined number of solutions as a new initial solution, the reception device including the control means that consecutively generates, based on an initial solution that is predetermined data, solutions dependent on the initial solution and uniquely determined by the initial solution, and adapted to be capable of generating the same solutions as the transmitting-side solution generating means if it uses the same initial solution that is used by the transmitting-side solution generating means, to execute the processes of: receiving the data to become the initial solution from the transmission device; receiving the encrypted data from the transmission device; generating a predetermined number, which had been agreed upon with the transmission device, of solutions using the data to become the initial solution received from the transmission device as an initial solution; generating a solution using a last solution among the predetermined number of solutions as a new initial solution; and decrypting the encrypted data using the solution generated using the last solution among the predetermined number of solutions as a new initial solution.

A same operational effect as the latter reception device can be achieved by the following method.

The method is a method to be executed by a reception device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the transmission device adapted to include: transmitting-side solution generating means for consecutively generating, based on an initial solution that is predetermined data, solutions dependent on the initial solution and uniquely determined by the initial solution; encrypting means that uses the solutions generated by the transmitting-side solution generating means to encrypt the transmission object data to create encrypted data; transmitting-side communicating means for communicating with the reception device via the network; and means for receiving data to become the initial solution from the reception device when transmission/reception of the encrypted data is performed, the transmitting-side solution generating means being adapted to generate a predetermined number of solutions mutually agreed-upon with the reception device and to generate a solution using a last solution among the predetermined number of solutions as a new initial solution when data to become the initial solution is received from the reception device, and the encrypting means being adapted to encrypt the transmission object data using a solution generated by the transmitting-side solution generating means using a last solution among the predetermined number of solutions as a new initial solution, wherein the reception device includes control means that consecutively generate, based on an initial solution that is predetermined data, solutions dependent on the initial solution and uniquely determined by the initial solution, and adapted to be capable of generating the same solutions as the transmitting-side solution generating means if it uses the same initial solution that is used by the transmitting-side solution generating means.

In addition, the method includes processes in which the control means: transmits the data to become the initial solution to the transmission device; receives the encrypted data from the transmission device; generates a predetermined number, which had been agreed upon with the transmission device, of solutions using the data to become the initial solution transmitted to the transmission device as an initial solution; generates a solution using a last solution among the predetermined number of solutions as a new initial solution; and decrypts the encrypted data using the solution generated using the last solution among the predetermined number of solutions as a new initial solution.

The latter reception device can be realized with, for example, a computer program described below. The use of the computer program enables the same operational effect as the latter transmission device to be achieved even with a general-purpose computer (for example, a personal computer or a mobile phone).

The computer program is a computer program that causes control means of a reception device that constitutes a transmission/reception system including: a transmission device capable of transmitting, via a predetermined network, encrypted data created by encrypting transmission object data that is data to become an object of transmission; and a reception device capable of receiving the encrypted data from the transmission device via the network, in combination with the transmission device adapted to include: transmitting-side solution generating means for consecutively generating, based on an initial solution that is predetermined data, solutions dependent on the initial solution and uniquely determined by the initial solution; encrypting means that uses the solutions generated by the transmitting-side solution generating means to encrypt the transmission object data to create encrypted data; transmitting-side communicating means for communicating with the reception device via the network; and means for receiving data to become the initial solution from the reception device when transmission/reception of the encrypted data is performed, the transmitting-side solution generating means being adapted to generate a predetermined number of solutions mutually agreed-upon with the reception device and to generate a solution using a last solution among the predetermined number of solutions as a new initial solution when data to become the initial solution is received from the reception device, and the encrypting means being adapted to encrypt the transmission object data using a solution generated by the transmitting-side solution generating means using a last solution among the predetermined number of solutions as a new initial solution, the reception device including the control means that consecutively generate, based on an initial solution that is predetermined data, solutions dependent on the initial solution and uniquely determined by the initial solution, and adapted to be capable of generating the same solutions as the transmitting-side solution generating means if it uses the same initial solution that is used by the transmitting-side solution generating means, to execute the processes of: transmitting the data to become the initial solution to the transmission device; receiving the encrypted data from the transmission device; generating a predetermined number, which had been agreed upon with the transmission device, of solutions using the data to become the initial solution transmitted to the transmission device as an initial solution; generating a solution using a last solution among the predetermined number of solutions as a new initial solution; and decrypting the encrypted data using the solution generated using the last solution among the predetermined number of solutions as a new initial solution.

The second invention according to the present application is as follows.

The second invention according to the present application is a transmission/reception system including: an authentication device which is capable of transmitting, via a predetermined network, encrypted data created by encrypting transmission object data that is data to become an object of transmission, and authenticating validity of a plurality of user devices; and a plurality of user devices capable of receiving the encrypted data from the authentication device via the network when the validity of the user devices is authenticated by the authentication device.

The authentication device of the transmission/reception system according to the second invention includes: authenticating-side solution generating means for consecutively generating, based on an initial solution that is predetermined data, solutions dependent on the initial solution and uniquely determined by the initial solution; encrypting means that uses the solutions generated by the authenticating-side solution generating means to encrypt the transmission object data to create encrypted data; authenticating-side recording means for recording, in association with each other, an ID that is information unique to each user device and an initial solution of each user device and which is unique to each user device or a solution created from the initial solution; authenticating-side communicating means for communicating with the user devices via the network; and authenticating means for judging a validity of the user devices.

Each of the user devices of the transmission/reception system according to the second invention includes: user-side solution generating means that consecutively generates, based on an initial solution that is predetermined data, solutions dependent on the initial solution and uniquely determined by the initial solution, and adapted to be capable of generating the same solutions as the authenticating-side solution generating means by using the same initial solution that is used by the authenticating-side solution generating means; decrypting means that uses the solutions generated by the user-side solution generating means to decrypt the encrypted data that had been encrypted by the authentication device; user-side recording means for storing an ID of the user device; and user-side communicating means for communicating with the authentication device via the network.

In addition, the user device is adapted to transmit an ID recorded in the user-side recording means and the initial solution or a solution generated by the user-side solution generating means based on the initial solution to the authentication device when transmission/reception of the encrypted data is being performed, the authenticating-side solution generating means of the authentication device being adapted to read from the authenticating-side recording means the initial solution associated with the same ID as the ID accepted from the user device or a solution generated from the initial solution and generates a solution based on the initial solution or the solution, the authenticating means of the authentication device being adapted to judge whether or not the solution generated by the authenticating-side solution generating means is consistent with the solution accepted from the user device and judge that the user device is valid when the solutions are consistent, and when the authentication device judges that the user device is valid, the authenticating-side solution generating means and the user-side solution generating means are adapted to generate a mutually agreed-upon predetermined number of solutions, and subsequently generate solutions using a last solution among the predetermined number of solutions as a new initial solution, the encrypting means is adapted to encrypt the transmission object data using the solution generated by the authenticating-side solution generating means based on the new initial solution, and the decrypting means is adapted to decrypt the encrypted data using the solution generated by the user-side solution generating means based on the new initial solution.

Roughly speaking, the authentication device according to the second invention corresponds to the transmission device according to the first invention and the user device according to the second invention corresponds to the reception device according to the first invention. What is more, the authentication device according to the second invention is also adapted to be capable of authenticating a validity of a transmission device using authenticating means.

The transmission/reception system according to the first invention is adapted such that data to become an initial solution is to be sent from one of the transmission device and the reception device to the other. However, with the transmission/reception system according to the second invention, instead of allowing data to become an initial solution sent from one of the user device and the authentication device to the other, data to become an initial solution is adapted to be sent from the user device to the authentication device. This is because the authentication device uses the accepted data to become the initial solution not only for generating a predetermined number of solutions in the same manner as whichever receives the data to become the initial solution among the transmission device and the reception device according to the first invention, but also for authenticating a user device. Moreover, in the second invention, because data to become an initial solution is to be used for authenticating a user device, the data to become an initial solution is solutions consecutively generated by the user device. No such restriction is placed on data to become an initial solution according to the first invention and any data is to suffice as the data to become the initial solution.

An initial solution used by a user device to generate solutions is unique to each user device. Consequently, solutions that can be generated by each user device (several of the solutions are to be used as initial solutions) are unique to each user device. In addition, each user device includes an ID unique to each user device and is adapted to transmit the ID together with data to become an initial solution when sending the data to the authentication device. The authentication device includes authenticating-side recording means that records, in association with each other, an ID that is information unique to each user device and an initial solution of each user device which is unique to each user device or a solution created from the initial solution. Therefore, using the authenticating-side solution generating means, the authentication device can reproduce and generate a solution that can be generated from an initial solution associated with the ID sent from the user device. The authenticating means of the authentication device is arranged to authenticate a user device based on whether or not an initial solution sent from the user device can be generated from an initial solution or a solution generated based on the initial solution recorded in the authenticating-side recording means in association with the ID sent together with the initial solution.

A method of encrypted communication to be performed between the user device and the authentication device after the user device is judged to be valid by the authentication device is similar to the case of the first invention. Therefore, the encrypted communication to be performed by the transmission/reception system according to the second invention has similar high encryption strength as the case of the first invention.

As described above, the authenticating-side recording means of the authentication device records, in association with each other, an ID that is information unique to each user device an initial solution of each user device which is unique to each user device or a solution created from the initial solution. Both an initial solution of each user device and a solution generated from the initial solution need not be recorded on the authenticating-side recording means. As long an initial solution allocated to each user device exists, the authenticating-side solution generating means is capable of generating the same solution as the solution generated by the user-side solution generating means of each user device. However, as a general rule, since a solution already used by each user device is not to be reused, it is wasteful to collate data of an initial solution sent together with an ID from the user device for authentication purposes with the initial solution of the user device that is associated with the ID of the user device and all solutions generated from the initial solution. For example, if a solution last used by the authentication device when transmission object data is changed into encrypted data is recorded on the authenticating-side recording means in a state where the solution is associated with an ID of each user device, a solution to be subsequently generated at a user device is included in solutions to be generated based on the solution. Therefore, unnecessary collation of data of an initial solution sent together with an ID from a user device for authentication purposes can be eliminated.

In this case, the authentication device of the transmission/reception system according to the second invention may be adapted such that after the transmission object data is encrypted and changed into encrypted data, a solution that is last used among the solutions used when encrypting the transmission object data is recorded in the authenticating-side recording means, and after the encrypted data is decrypted and changed into transmission object data, a solution that is last used along the solutions used when decrypting the encrypted data is recorded in the user-side recording means.

The authenticating-side solution generating means and the user-side solution generating means of the authentication device and the user device included in the transmission/reception system according to the second invention generate solutions to be used when encrypting transmission object data or decrypting encrypted data. In this case, one or a plurality of solutions may respectively be used for encrypting transmission object data and decrypting encrypted data.

In the case of the latter, the encrypting means may be adapted to divide the transmission object data into pieces having a predetermined bit length to create divisional transmission object data and subsequently sequentially encrypt the respective pieces of divisional transmission object data using different solutions generated by the authenticating-side solution generating means, and the decrypting means may be adapted to divide the encrypted data into pieces having a predetermined bit length to create divisional encrypted data and subsequently sequentially decrypt the respective pieces of divisional encrypted data using different solutions generated by the user-side solution generating means.

The present inventor proposes the authentication device to be included in the transmission/reception system described above as one of the second inventions according to the present application.

A same operational effect as the authentication device can be achieved by the following method.

The method is a method to be executed by an authentication device that constitutes a transmission/reception system including: an authentication device capable of transmitting, via a predetermined network, encrypted data created by encrypting transmission object data that is data to become an object of transmission, and authenticating validity of a plurality of user devices; and a plurality of user devices capable of receiving the encrypted data from the authentication device via the network when the validity of the plurality of user devices is authenticated by the authentication device, in combination with the user device adapted to include: user-side solution generating means for consecutively generating, based on an initial solution that is predetermined data, solutions dependent on the initial solution and uniquely determined by the initial solution; decrypting means that uses the solutions generated by the user-side solution generating means to decrypt encrypted data that had been encrypted by the authentication device; user-side recording means that records an ID of the user device; user-side communicating means for communicating with the authentication device via the network; and means for transmitting the ID and the initial solution or a solution generated based on the initial solution to the authentication device when transmission/reception of the encrypted data is performed, the user-side solution generating means being adapted to generate a predetermined number of solutions mutually agreed-upon with the authentication device and to generate a solution by using a last solution among the predetermined number of solutions as a new initial solution, and the decrypting means being adapted to decrypt encrypted data accepted from the authentication device, after the user device is judged to be valid by the authentication device, using a solution generated by the user-side solution generating means using a last solution among the predetermined number of solutions as a new initial solution, wherein the authentication device includes: authenticating-side recording means that records, in association with each other, an ID that is information unique to each user device and an initial solution of each user device and which is unique to each user device or a solution created from the initial solution; and control means that consecutively generates, based on an initial solution that is predetermined data, solutions dependent on the initial solution and uniquely determined by the initial solution, and adapted to be capable of generating the same solutions as the user-side solution generating means if it uses the same initial solution that is used by the user-side solution generating means.

In addition, the method includes processes of: receiving, from the user device, an ID of the user device and the initial solution or a solution generated based on the initial solution; reading, from the authenticating-side recording means, the initial solution associated with the same ID as the ID accepted from the user device or a solution generated from the initial solution and generating a solution based on the initial solution or the solution; judging whether or not the generated solution is consistent with the solution accepted from the user device and, when the solutions are consistent, judging that the user device is valid; generating, when the user device is judged to be valid, a predetermined number of solutions agreed upon with the user device using the initial solution or a solution generated based on the initial solution received from the user device as an initial solution; and encrypting the transmission object data using a solution generated using a last solution among the predetermined number of solutions as a new initial solution.

The authentication device can be realized with, for example, a computer program described below. The use of the computer program enables the same operational effect as the authentication device to be achieved even with a general-purpose computer (for example, a personal computer).

The computer program is a computer program that causes control means of an authentication device that constitutes a transmission/reception system including: an authentication device capable of transmitting, via a predetermined network, encrypted data created by encrypting transmission object data that is data to become an object of transmission, and authenticating validity of a plurality of user devices; and a plurality of user devices capable of receiving the encrypted data from the authentication device via the network when the validity of the plurality of user devices is authenticated by the authentication device, in combination with the user device adapted to include: user-side solution generating means for consecutively generating, based on an initial solution that is predetermined data, solutions dependent on the initial solution and uniquely determined by the initial solution; decrypting means that uses the solutions generated by the user-side solution generating means to decrypt encrypted data that had been encrypted by the authentication device; user-side recording means that records an ID of the user device; user-side communicating means for communicating with the authentication device via the network; and means for transmitting the ID and the initial solution or a solution generated based on the initial solution to the authentication device when transmission/reception of the encrypted data is performed, the user-side solution generating means being adapted to generate a predetermined number of solutions mutually agreed-upon with the authentication device and to generate a solution by using a last solution among the predetermined number of solutions as a new initial solution, and the decrypting means being adapted to decrypt encrypted data accepted from the authentication device, after the user device is judged to be valid by the authentication device, using a solution generated by the user-side solution generating means using a last solution among the predetermined number of solutions as a new initial solution, wherein the authentication device includes: authenticating-side recording means that records, in association with each other, an ID that is information unique to each user device and an initial solution of each user device and which is unique to each user device or a solution created from the initial solution; and control means that consecutively generates, based on an initial solution that is predetermined data, solutions dependent on the initial solution and uniquely determined by the initial solution, and adapted to be capable of generating the same solutions as the user-side solution generating means if it uses the same initial solution that is used by the user-side solution generating means, to execute the processes of: receiving, from the user device, an ID of the user device and the initial solution or a solution generated based on the initial solution; reading, from the authenticating-side recording means, the initial solution associated with the same ID as the ID accepted from the user device or a solution generated from the initial solution and generating a solution based on the initial solution or the solution; judging whether or not the generated solution is consistent with the solution accepted from the user device and, when the solutions are consistent, judging that the user device is valid; generating, when the user device is judged to be valid, a predetermined number of solutions agreed upon with the user device using the initial solution or a solution generated based on the initial solution received from the reception device as an initial solution; and encrypting the transmission object data using a solution generated using a last solution among the predetermined number of solutions as a new initial solution.

The present inventor proposes the user device to be included in the transmission/reception system described above as one of the second inventions according to the present application.

A same operational effect as the user device can be achieved by the following method.

The method is a method to be executed by a user device that constitutes a transmission/reception system including: an authentication device capable of transmitting, via a predetermined network, encrypted data created by encrypting transmission object data that is data to become an object of transmission, and authenticating validity of a plurality of user devices; and a plurality of user devices capable of receiving the encrypted data from the authentication device via the network when the validity of the plurality of user devices is authenticated by the authentication device, in combination with the authentication device adapted to include: authenticating-side solution generating means for consecutively generating, based on an initial solution that is predetermined data, solutions dependent on the initial solution and uniquely determined by the initial solution; encrypting means that uses the solutions generated by the authenticating-side solution generating means to encrypt the transmission object data to create encrypted data; authenticating-side recording means that records, in association with each other, an ID that is information unique to each user device and an initial solution of each user device which is unique to each user device or a solution generated from the initial solution; authenticating-side communicating means for communicating with the user device via the network; authenticating means for authenticating a validity of the user device; and means for accepting the ID and the initial solution or a solution generated based on the initial solution from the user device when transmission/reception of the encrypted data is performed, the authenticating-side solution generating means being adapted to read from the authenticating-side recording means, when the ID and the solution has been accepted, the initial solution associated with a same ID as the ID accepted from the user device or a solution generated from the initial solution and generate a solution based on the initial solution or the solution, the authenticating means being adapted to judge whether or not the solution generated by the authenticating-side solution generating means is consistent with the solution accepted from the user device and, when the solutions are consistent, judge that the user device is valid, the authenticating-side solution generating means being adapted to generate, when the user device is judged to be valid, a predetermined number of solutions agreed upon with the user device and generate a solution using a last solution among the predetermined number of solutions as a new initial solution, and the encrypting means being adapted to encrypt the transmission object data using a solution generated by the authenticating-side solution generating means using a last solution among the predetermined number of solutions as a new initial solution, wherein the user device includes control means that consecutively generates, based on an initial solution that is predetermined data, solutions dependent on the initial solution and uniquely determined by the initial solution, and adapted to be capable of generating the same solutions as the authenticating-side solution generating means if it uses the same initial solution that is used by the authenticating-side solution generating means.

In addition, the method includes processes in which the control means: transmits an ID of the user device and the initial solution or a solution generated based on the initial solution to the authentication device; receives the encrypted data from the authentication device; generates a predetermined number, which had been agreed upon with the authentication device, of solutions using the initial solution or a solution generated based on the initial solution transmitted to the authentication device as an initial solution; and decrypts the encrypted data using a solution generated using the last solution among the predetermined number of solutions as a new initial solution.

The user device can be realized with, for example, a computer program described below. The use of the computer program enables the same operational effect as the user device to be achieved even with a general-purpose computer (for example, a personal computer or a mobile phone).

The computer program is a computer program that causes control means of a user device that constitutes a transmission/reception system including: an authentication device capable of transmitting, via a predetermined network, encrypted data created by encrypting transmission object data that is data to become an object of transmission, and authenticating validity of a plurality of user devices; and a plurality of user devices capable of receiving the encrypted data from the authentication device via the network when the validity of the plurality of user devices is authenticated by the authentication device, in combination with the authentication device adapted to include: authenticating-side solution generating means for consecutively generating, based on an initial solution that is predetermined data, solutions dependent on the initial solution and uniquely determined by the initial solution; encrypting means that uses the solutions generated by the authenticating-side solution generating means to encrypt the transmission object data to create encrypted data; authenticating-side recording means that records, in association with each other, an ID that is information unique to each user device and an initial solution of each user device which is unique to each user device or a solution generated from the initial solution; authenticating-side communicating means for communicating with the user device via the network; authenticating means for authenticating a validity of the user device; and means for accepting the ID and the initial solution or a solution generated based on the initial solution from the user device when transmission/reception of the encrypted data is performed, the authenticating-side solution generating means being adapted to read from the authenticating-side recording means, when the ID and the solution has been accepted, the initial solution associated with a same ID as the ID accepted from the user device or a solution generated from the initial solution and generate a solution based on the initial solution or the solution, the authenticating means being adapted to judge whether or not the solution generated by the authenticating-side solution generating means is consistent with the solution accepted from the user device and, when the solutions are consistent, judge that the user device is valid, the authenticating-side solution generating means being adapted to generate, when the user device is judged to be valid, a predetermined number of solutions agreed upon with the user device and generate a solution using a last solution among the predetermined number of solutions as a new initial solution, and the encrypting means being adapted to encrypt the transmission object data using a solution generated by the authenticating-side solution generating means using a last solution among the predetermined number of solutions as a new initial solution, wherein the user device includes the control means that consecutively generate, based on an initial solution that is predetermined data, solutions dependent on the initial solution and uniquely determined by the initial solution, and adapted to be capable of generating the same solutions as the authenticating-side solution generating means if it uses the same initial solution that is used by the authenticating-side solution generating means, to execute processes for: transmitting an ID of the user device and the initial solution or a solution generated based on the initial solution to the authentication device; receiving the encrypted data from the authentication device; generating a predetermined number, which had been agreed upon with the authentication device, of solutions using the initial solution or the solution generated based on the initial solution transmitted to the authentication device as an initial solution; and decrypting the encrypted data using the solution generated using the last solution among the predetermined number of solutions as a new initial solution.

BRIEF DESCRIPTION OF DRAWINGS

FIG. 9 is a diagram illustrating an example of data recorded in an initial common data group recording unit illustrated in FIG. 8.

DESCRIPTION OF EMBODIMENTS

Figure 1:
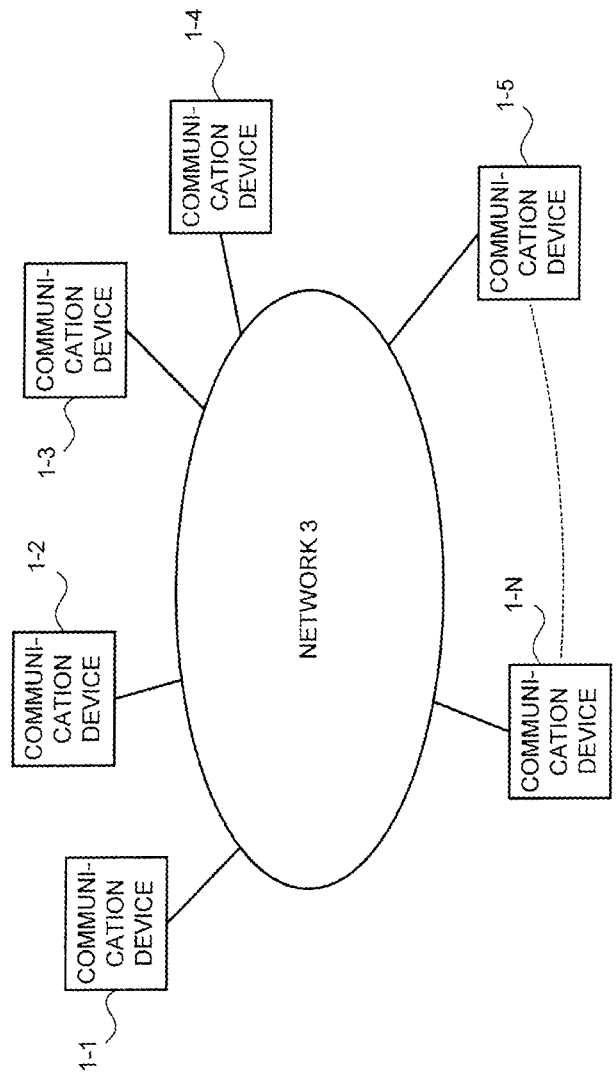
FIG. 1 is a diagram illustrating an overall configuration of a transmission/reception system according to a first embodiment.

Hereinafter, first and second embodiments of the present invention will be described.

In both embodiments, same reference characters are to be attached to redundant objects, in which case redundant descriptions may be omitted from time to time.

First Embodiment

A transmission/reception system according to the present embodiment is schematically configured as illustrated in FIG. 1.

The transmission/reception system includes N-number of communication devices 1 from a communication device 1-1, a communication device 1-2, a communication device 1-3, ..., to a communication device 1-N. The communication devices 1 are connected to each other by a predetermined network 3. While not limited thereto, the network 3 according to the present embodiment is the Internet. The network 3 may be constituted by a network other than the Internet such as a LAN or may include a network in addition to the Internet.

The communication device 1 includes a computer. The communication devices 1-1 to 1-N are adapted to be capable of transmitting/receiving data among each other. With respect to the first invention according to the present application, all communication devices 1 according to the present embodiment double as a transmission device and a reception device. Any data may be mutually transmitted/received among the communication devices 1.

While not limited thereto, the communication device 1 according to the present embodiment is a general-purpose personal computer. The communication device 1 may also be constituted by a mobile phone.

While not limited thereto, data to be transmitted/received among the respective communication devices 1-1 to 1-N in the present embodiment is electronic mail data. In the present embodiment, electronic mails are encrypted and transmitted/received among the respective communication devices 1-1 to 1-N. While not necessarily limited thereto, the communication device 1 in the present embodiment divides data to be transmitted/received into packets to perform packet communication.

Next, a configuration of the communication device 1 will be described. With respect to the present first invention, configurations of the respective communication devices 1-1 to 1-N can be considered as being the same.

Figure 2:
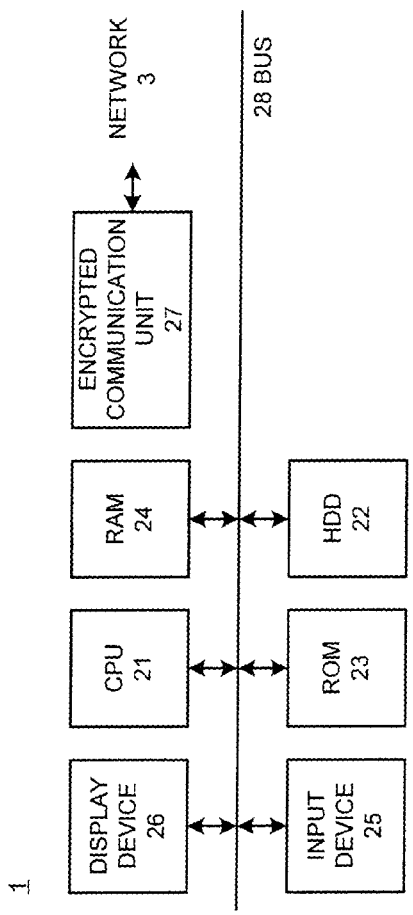
FIG. 2 is a diagram illustrating a hardware configuration of a communication device included in the transmission/reception system illustrated in FIG. 1.

FIG. 2 illustrates a hardware configuration of the communication device 1 that is shared by the respective communication devices 1-1 to 1-N.

The communication device 1 in the present embodiment is configured so as to include a CPU (central processing unit) 21, an HDD (hard disc drive) 22, a ROM (read only memory) 23, a RAM (random access memory) 24, an input device 25, a display device 26, an encrypted communication unit 27, and a bus 28. The CPU 21, the HDD 22, the ROM 23, the RAM 24, the input device 25, the display device 26, and the encrypted communication unit 27 are adapted to be capable of exchanging data via the bus 28.

Recorded in the ROM 23 are predetermined programs, and data and the like necessary for executing the programs. The programs include a program according to the present invention. The program according to the present invention may be adapted to execute processing to be described later in cooperation with another program such as an OS or with other data. In addition, the program may be mounted onto the communication device 1 prior to shipment of the communication device 1, or may be manually installed by a user after the shipment of the communication device 1. When installing the program into the communication device 1, the program may be installed into the communication device 1 from a predetermined recording medium or by way of distribution via a network. Moreover, a part of the programs, data, and the like recorded on the ROM 23 may alternatively be recorded on the HDD 22.

The HDD 22 is a large-capacity storage medium. As described above, the HDD 22 can take over a part of the functions of the ROM 23. In addition, the HDD 22 can take over a part of the functions of the RAM 24. Furthermore, programs and data not recorded on the ROM 23 and the RAM 24 are recorded on the HDD 22. For example, in the present embodiment, a program of an OS that controls the communication device 1 is recorded on the HDD 22.

The CPU 21 performs overall control of the communication device 1 and executes the processing described later based on the programs or data recorded in the ROM 23. The RAM 24 is used as a work storage area when the CPU 21 performs processing to be described later. In addition, the RAM 24 is adapted such that the initial solutions, to be described later, are recorded as needed.

The input device 25 is adapted to enable input that is necessary when at least one communication device 1 communicates with another communication device 1. While not limited thereto, the input device 25 can be constituted by a keyboard and a mouse. It is obvious that other known input means can be adopted as the input device 25.

The display device 26 is constituted by, for example, an LCD (liquid crystal display). The display device 26 is adapted to display contents inputted from the input device 25, contents of processing executed by the communication device 1, and the like. It is obvious that known display means such as a CRT (cathode ray tube), an organic EL (electro luminescence) panel, and the like can be adopted as the display device 26.

The encrypted communication unit 27 performs communication via the network 3. The encrypted communication unit 27 is capable of performing encrypted communication using encrypted data for both transmission and reception. The encrypted communication unit 27 of one communication device 1 can perform transmission/reception of encrypted data with the encrypted communication unit 27 of another communication device 1. Details of the encrypted communication to be performed by the encrypted communication unit 27 will be described later.

Figure 3:
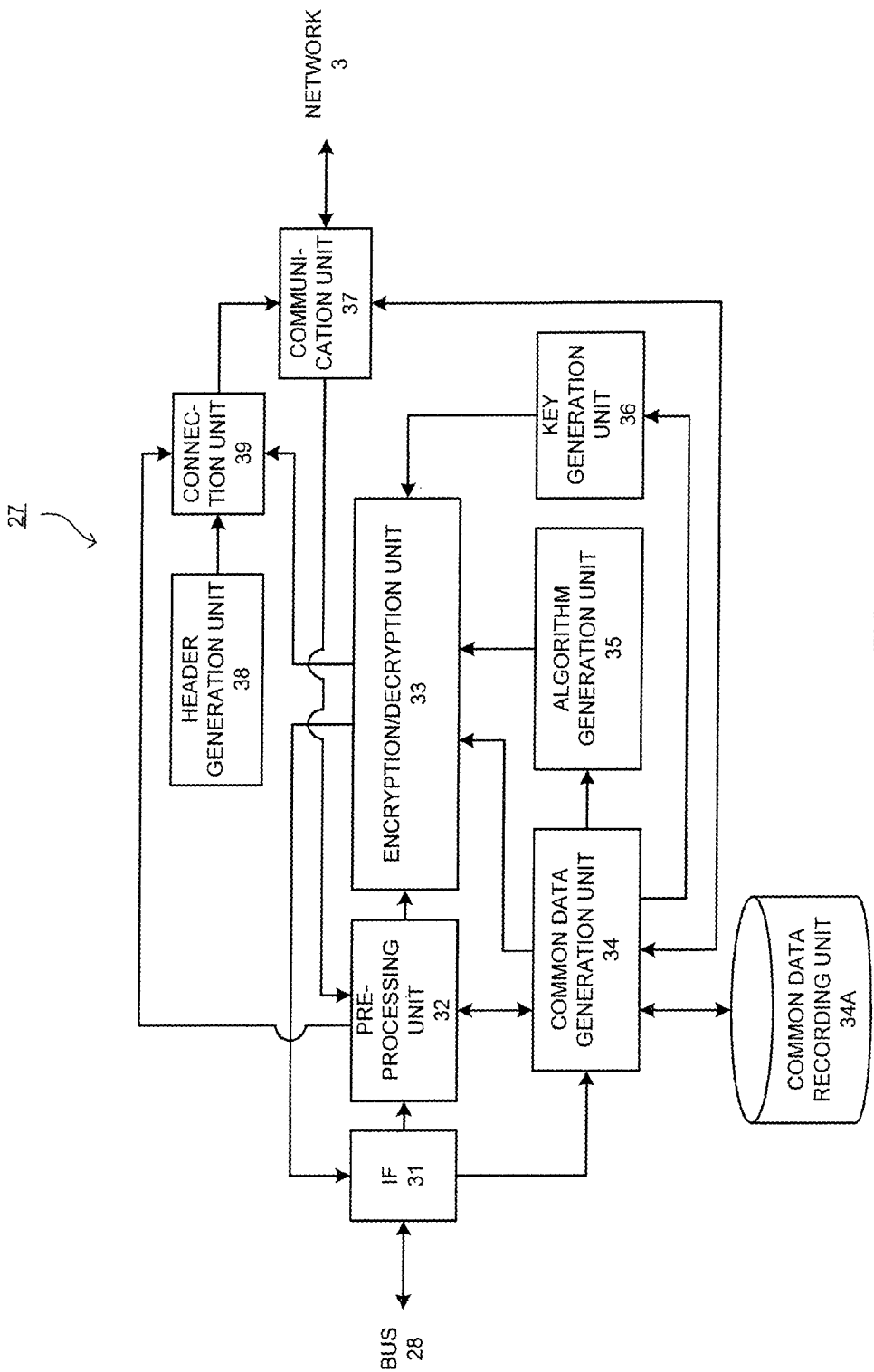
FIG. 3 is a block diagram illustrating a configuration of an encrypted communication unit of the communication device included in the transmission/reception system illustrated in FIG. 1.

Next, a configuration of the encrypted communication unit 27 will be described. FIG. 3 illustrates a block configuration diagram of the encrypted communication unit 27. A part of the functions of the encrypted communication unit 27 may be constituted by functions of the programs described above. The present embodiment adopts such an arrangement.

The encrypted communication unit 27 includes an interface unit 31, a pre-processing unit 32, an encryption/decryption unit 33, a common data generation unit 34, a common data recording unit 34A, an algorithm generation unit 35, a key generation unit 36, a communication unit 37, a header generation unit 38, and a connection unit 39.

Moreover, the communication device 1 may function as a transmission device that transmits data in some cases and as a reception device that receives data in others. As such, the functions of the encrypted communication unit 27, the interface unit 31, the pre-processing unit 32, the encryption/decryption unit 33, the common data generation unit 34, the algorithm generation unit 35, the key generation unit 36, the communication unit 37, the header generation unit 38, and the connection unit 39 may differ between cases where the communication device 1 functions as a transmission device and cases where the communication device 1 functions as a reception device. Therefore, in the following description, both cases will be separately described by expressing the former as "during transmission" and the latter as "during reception".

The interface unit 31 exchanges data between the bus 28 and the encrypted communication unit 27.

During transmission, the interface unit 31 functions as follows. The interface unit 31 is adapted to send data accepted from the bus 28 (for example, electronic mail data to be described later) to the pre-processing unit 32. In addition, the interface unit 31 is adapted such that when accepting audio data from the bus 28, the interface unit 31 notifies that audio data has been accepted to the common data generation unit 34.

On the other hand, during reception, the interface unit 31 functions as follows. The interface unit 31 is adapted to send data accepted from another communication device 1 via the network 3 (for example, electronic mail data to be described later) to the bus 28.

During transmission, the pre-processing unit 32 is adapted to divide data received from the bus 28 (for example, electronic mail data) via the interface unit 31 into pieces having a predetermined number of bits to create packets. The pre-processing unit 32 is adapted to send the generated packets to the encryption/decryption unit 33.

During reception, the pre-processing unit 32 functions as follows. The pre-processing unit 32 is adapted such that upon accepting electronic mail data formed into a sequence of packets from the communication device 1 of the other party via the communication unit 37, the pre-processing unit 32 sends the electronic mail data to the encryption/decryption unit 33. In addition, the pre-processing unit 32 is adapted such that upon accepting data from the communication device 1 of the other party via the communication unit 37, the pre-processing unit 32 notifies the acceptance of the data to the common data generation unit 34.

The common data generation unit 34 sequentially generates common data. The common data corresponds to a "solution" according to the present invention. In that sense, the common data generation unit 34 functions during transmission as transmitting-side solution generating means according to the present application and functions during reception as receiving-side solution generating means according to the present application. It should be noted that in the description of the embodiments, "solution" and "common data" are synonymous.

Common data is generated based on an initial solution (initial common data). The common data may be, for example, consecutive numbers such as 1, 2, 3, . . . . In the present embodiment, common data is consecutively generated based on a previous solution generated by the common data generation unit 34. In the present embodiment, while not necessarily limited thereto, a plurality of pieces of consecutively generated common data becomes pseudorandom numbers performing nonlinear transition and exhibits chaotic behavior. Data of an initial solution necessary for generating common data is recorded in the common data recording unit 34A at least in a state before a first communication is performed. In addition, the common data recording unit 34A is to record, whenever necessary, previously generated common data that becomes necessary for generating common data. Writing and updating of common data to the common data recording unit 34A are adapted to be performed by the common data generation unit 34.

When communication is to be performed between communication devices 1, common data respectively generated in the same order is the same common data if the same initial solution is used, in which case the common data is to be shared between both communication devices 1 performing the communication. This mechanism will be described later.

The common data generation unit 34 commences generation of common data upon receiving a notification to the effect that electronic mail data has been received from the interface unit 31 during transmission of electronic mail data to another communication device 1, and upon receiving a notification to the effect that electronic mail data has been received from the pre-processing unit 32 during reception of electronic mail data from another communication device 1.

The generated common data is to be sent to the pre-processing unit 32, the encryption/decryption unit 33, the algorithm generation unit 35, and the key generation unit 36 both during transmission and during reception. Moreover, during transmission, the common data generation unit 34 is adapted to send data of an initial solution used to consecutively generate solutions to the communication unit 37 as well as to the receiving communication device 1 via the communication unit 37.

A mechanism for generating common data that is a pseudorandom number in the same manner inside two communication devices 1, namely, the transmitting communication device 1 and the receiving communication device 1, which are separated from each other will be described in detail later.

The encryption/decryption unit 33 functions to encrypt data accepted from the pre-processing unit 32 (for example, electronic mail data) to create encrypted data during transmission, and to decrypt encrypted data accepted from the pre-processing unit 32 to restore common data during reception.

Figure 4:
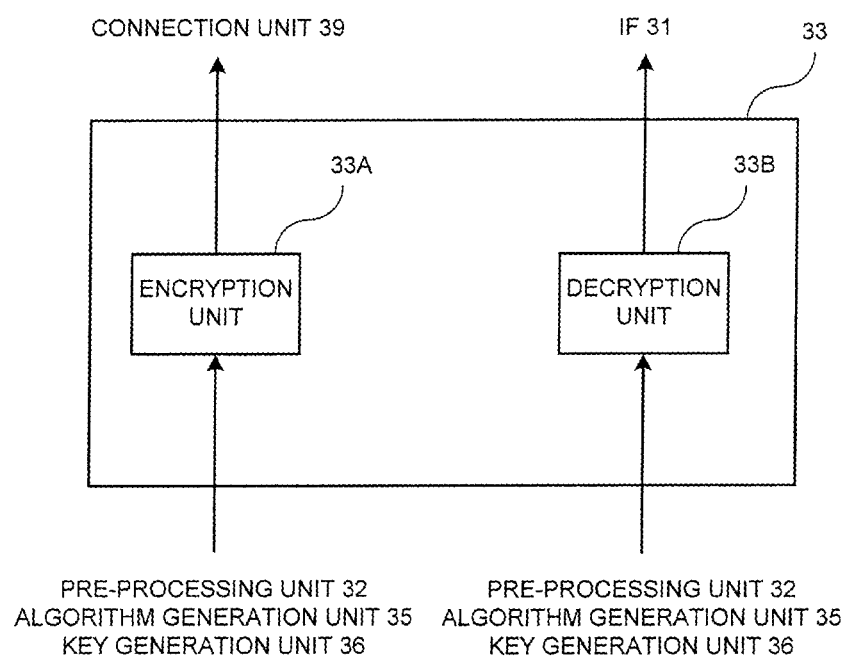
FIG. 4 is a block diagram illustrating a configuration of an encryption/decryption unit included in the encrypted communication unit illustrated in FIG. 3.

As illustrated in FIG. 4, the encryption/decryption unit 33 includes an encryption unit 33A and a decryption unit 33B, and is adapted such that the encryption unit 33A executes encryption and the decryption unit 33B executes decryption. Encrypted data generated by encryption by the encryption unit 33A is to be sent to the connection unit 39. Data generated by decryption by the decryption unit 33B is to be sent to the interface unit 31.

When performing encryption or decryption, the encryption unit 33A and the decryption unit 33B of the encryption/decryption unit 33 both use an algorithm and a key. The algorithm and the key are to be supplied to the encryption/decryption unit 33 from the algorithm generation unit 35 and the key generation unit 36.

The algorithm generation unit 35 generates an algorithm based on common data accepted from the common data generation unit 34. The generated algorithm is to be sent from the algorithm generation unit 35 to the encryption/decryption unit 33.

The key generation unit 36 generates a key based on common data accepted from the common data generation unit 34. The generated key is to be sent from the key generation unit 36 to the encryption/decryption unit 33.

While not necessarily limited thereto, in the present embodiment, both the algorithm generation unit 35 and the key generation unit 36 are adapted to generate an algorithm or a key each time common data is accepted from the common data generation unit 34. Methods of generating an algorithm and a key will be described in detail later.

The header generation unit 38 functions only during transmission to generate data of headers to be attached to each packet encrypted by the encryption/decryption unit 33 and changed into encrypted data. A header includes, for example, information for identifying the communication device 1 that is a communication source, information for identifying the communication device 1 that is a communication destination, the amount of data included in the packet to which the header is attached, and other generally necessary information. Data to be included in a heater is to be sent in advance to the header generation unit from elsewhere such as the interface unit 31. The header generation unit 38 is adapted to send generated header data to the connection unit 39. The connection unit 39 functions only during transmission to integrate a header generated by the header generation unit 38 to an encrypted packet (for example, to a head of the packet) sent from the encryption/decryption unit 33.

The communication unit 37 handles data exchange with the network 3.

During transmission, the communication unit 37 is adapted to accept data that is a sequence of header-attached packets from the connection unit 39 and send the data to another communication device 1 via the network 3. During transmission, the communication unit 37 is adapted to send data of an initial solution received from the common data generation unit 134 to the receiving communication device 1 via the network 3.

During reception, the communication unit 37 is adapted to accept electronic mail data from the communication device 1. The communication unit 37 is adapted to send the data to the pre-processing unit 32. During reception, the communication unit 37 is adapted to accept initial solution data from the transmitting communication device 1 via the network 3. The communication unit 37 is adapted to send the initial solution data accepted from the transmitting communication device 1 to the common data generation unit 34.

Figure 5:
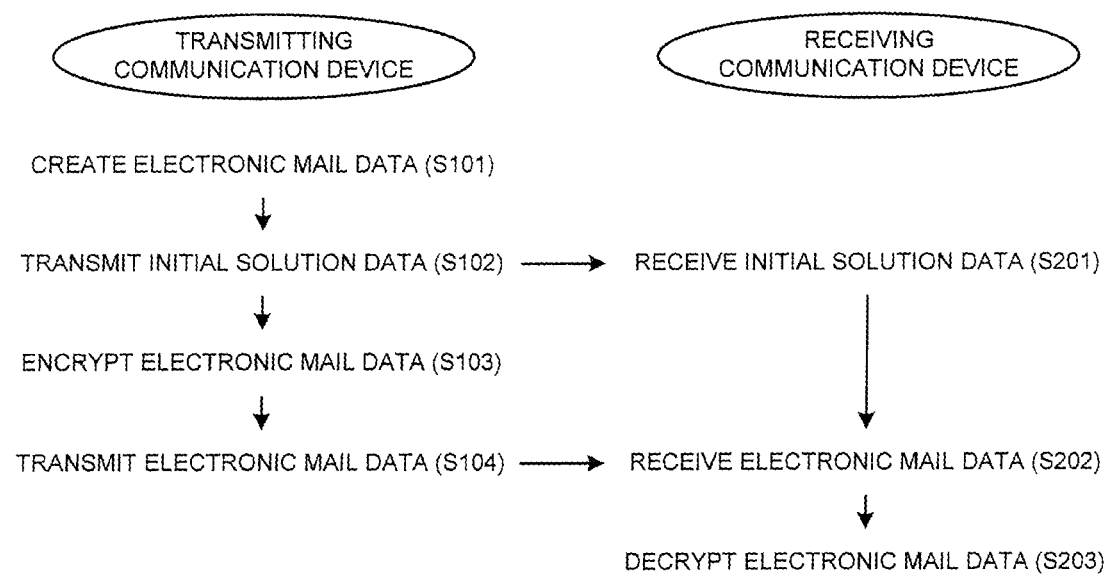
FIG. 5 is a flow chart illustrating a flow of processing executed during transmission in the transmission/reception system illustrated in FIG. 1.
Figure 6:
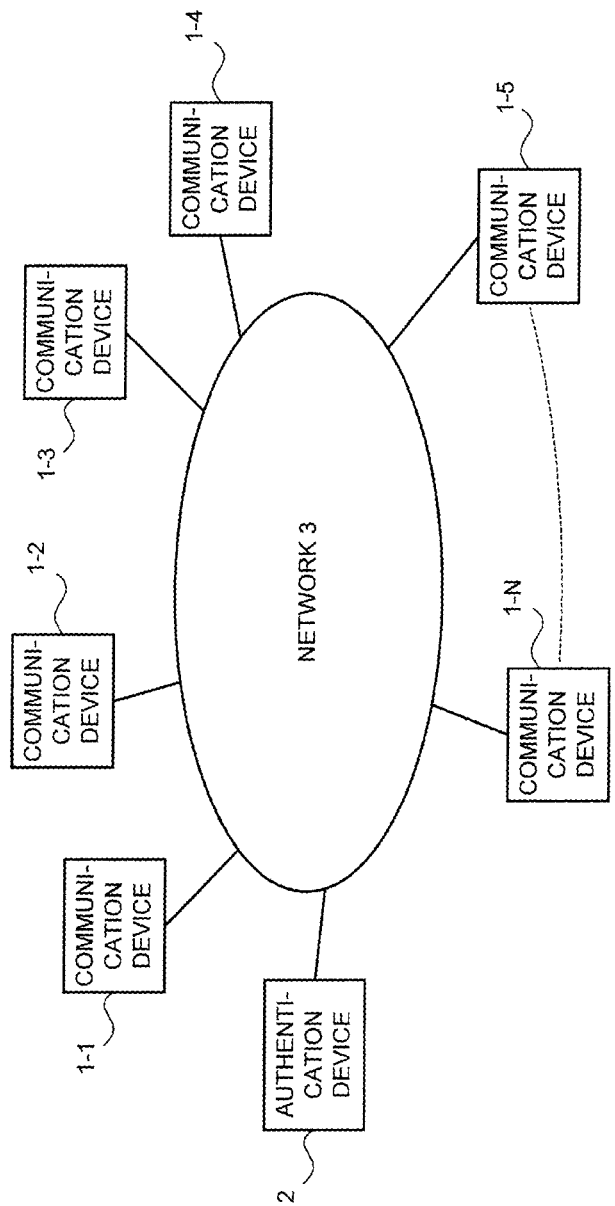
FIG. 6 is a diagram illustrating an overall configuration of a transmission/reception system according to a second embodiment.

Next, a flow of processing executed by the transmission/reception system will be described with reference to FIG. 5.

When communication is performed by the present communication system, first, one of the communication devices 1 to become the transmitting side generates electronic mail data that includes information for identifying another communication device 1 to become the other party of communication and data that requests communication with the other communication device 1 (S101).

Specifically, a user having a communication device 1 creates electronic mail data by operating the input device 25 of the user's own communication device 1 to input information for identifying another communication device 1 to become the other party of communication (for example, an electronic mail address usable by the other communication device 1) and to input data of contents to become a transmission object. Electronic mail data is generated by, for example, a function of a known mailer program of electronic mail recorded on the HDD 22 or the like. While the generated electronic mail data is to be encrypted later, in the present embodiment, the generated electronic mail data is temporarily recorded on the HDD 22 before encryption.

Next, the transmitting communication device 1 sends an initial solution to be used afterwards to encrypt the electronic mail to the receiving communication device 1 (S102).

The transmitting communication device 1 then encrypts the aforementioned electronic mail data recorded on the HDD 22 (S103).

Next, the transmitting communication device 1 sends the encrypted electronic mail data to the receiving communication device 1 via the network 3 (S104).

Processing of S102 to S104 will be described in detail below.

Prior to transmission to the receiving communication device 1, the electronic mail data is sent from the HDD 22 via the bus 28 to the encrypted communication unit 27 according to an instruction from the CPU 21. The electronic mail data is encrypted at the encrypted communication unit 27.

The electronic mail data is received by the interface unit 31 of the encrypted communication unit 27. The interface unit 31 sends communication request data to the pre-processing unit 32 and, at the same time, notifies the common data generation unit 34 that electronic mail data has been received.

The pre-processing unit 32 divides the electronic mail data into pieces having a predetermined number of bits to generate a large number of packets. While not necessarily limited thereto, in the present embodiment, communication request data is divided in sequence from the front so as to ensure that the order of data is not reversed. Moreover, while not necessarily required to do so, the pre-processing unit 32 according to the present embodiment is adapted to divide communication request data such that the size of data contained in each packet is the same. The packets generated by the pre-processing unit 32 are sent to the encryption/decryption unit 33.

On the other hand, the common data generation unit 34 having received the aforementioned notification from the interface unit 31 generates common data.

Generation of common data at the common data generation unit 34 is to be performed as follows. The common data generation unit 34 generates the same number of pieces of common data as the packets generated by the pre-processing unit 32 by dividing the communication request data. Moreover, while not limited thereto, common data according to the present embodiment is an 8 row-8 column matrix (X). While not necessarily limited thereto, as described above, the common data generation unit 34 in the present embodiment generates common data as pseudorandom numbers performing nonlinear transition.

Conceivable methods for consecutively generating common data so as to perform nonlinear transition include (1) including an exponential computation of previous common data in the common data generation process, (2) including multiplication of two or more previous pieces of common data in the common data generation process, and combining (1) and (2).

In the present embodiment, first common data ($X_{01}$) and second common data ($X_{02}$) are recorded in advance in the common data recording unit 34A as initial matrices that are initial solutions (initial common data) (the first common data and the second common data may alternatively be recorded in advance in the ROM 23 or the like). Moreover, while not necessarily limited thereto, in the present embodiment, the initial matrix included in each communication device 1 is adapted to be unique to each other.

The common data generation unit 34 reads the initial matrix from the common data recording unit 34A and uses the initial matrix to generate common data. The common data generation unit 34 sends the initial common data read from the common data recording unit 34A to the communication unit 37 before generating common data based on the read initial common data. The communication unit 37 sends the initial common data to the receiving communication device 1 via the network 3. Since the transmitted initial common data is to be used by the receiving communication device 1 to decrypt encrypted electronic mail data as will be described later, the initial common data need only be transmitted to the receiving communication device 1 at an appropriate timing where the receiving communication device 1 is able to receive the initial common data when the decryption is performed by the receiving communication device 1.

Subsequently, the common data generation unit 34 consecutively generates common data using the same initial common data that had been sent to the communication unit 37. The generation of common data is performed by substituting the initial common data into a common data generating algorithm retained by the common data generation unit 34.

First common data ($X_1$) is generated from initial common data as described below.

First common data $(X_1)=X_{02}X_{01}+\alpha$ (where $\alpha$ is an 8 row-8 column matrix)

This is the first piece of common data to be generated.

In this case, $\alpha$ represents environmental information. However, environmental information is not necessarily a requisite. $\alpha$ is arranged as, for example, a data string expressed in "1" and "0" when appropriate information such as a date or an electronic mail address used by the transmitting communication device 1 is converted into binary representation according to an appropriate rule and sequentially plugged into elements of an 8 row-8 column matrix. Moreover, if the number of numerals constituting the data string expressed in "1" and "0" when the date or the like is converted into binary representation is less than 64 which is the number of elements of an 8 row-8 column matrix, a may be created by repetitively using the data string made up of "1" and "0" whose number is smaller than 64. If the number of numerals constituting the data string is greater than 64, then a may be created by, for example, deleting unnecessary numerals.

The common data generation unit 34 generates second common data ($X_2$) in the following manner.

Second common data $(X_2)=X_1X_{02}+\alpha$

In a similar manner, the common data generation unit 34 generates third common data, fourth common data, . . . , Nth common data as follows.

Third common data $(X_3)=X_2X_1+\alpha$

Fourth common data $(X_4)=X_3X_2+\alpha$

Nth common data $(X_N)=X_{N-1}X_{N-2}+\alpha$

Common data which is generated in this manner and whose number is the same as the number of packets is sent to the algorithm generation unit 35 and the key generation unit 36 and, at the same time, retained in the common data generation unit 34 for generating the next piece of common data. In the present embodiment, in order to generate Nth common data ($X_N$), N−1th common data ($X_{N-1}$) and N−2th common data ($X_{N-2}$) or, in other words, the two pieces of common data generated immediately before the Nth common data ($X_N$) are to be used. Therefore, when generating new common data, the common data generation unit 34 must retain two pieces of common data generated immediately previously (or, some entity that is not the common data generation unit 34 must retain the two pieces of common data).

Common data generated in this manner is chaotic data that performs nonlinear transition and becomes pseudorandom numbers.

Moreover, $\alpha$ that represents environmental information need not necessarily be used whenever common data is generated. For example, the first common data may be generated by using a as expressed by $(X_1)=X_{02}X_{01}+\alpha$, and the second and subsequent common data may be generated by using $(X_N)=X_{N-1}X_{N-2}$ which is an expression that does not use $\alpha$.

In addition to using the expression

Nth common data $(X_N)=X_{N-1}X_{N-2}(+\alpha)$ described earlier when calculating the Nth common data, generated common data can conceivably be adapted to perform nonlinear transition by using an expression such as those listed below.

Moreover, the parentheses around $\alpha$ signify that $\alpha$ is not necessarily a requisite when generating all common data including the cases exemplified below or when generating the second and subsequent common data.

Expressions that can be used include

Nth common data $(X_N)=(X_{N-1})^P(+\alpha)$, (a)

Nth common data $(X_N)=(X_{N-1})^P(X_{N-2})^Q(X_{N-3})^R(X_{N-4})^S(+\alpha)$, and (b)

Nth common data $(X_N)=(X_{N-1})^P+(X_{N-2})^Q(+\alpha)$. (c)

P, Q, R, and S respectively denote predetermined constants. In addition, it is required that one initial matrix is recorded when using expression (a), two initial matrices when using expression (c), and four initial matrices when using expression (b) respectively in the common data recording unit 34A. Moreover, the present embodiment is adapted such that when a series of encryption or decryption is completed and generation of subsequent common data temporarily becomes unnecessary, common data that is generated last is to be used by the common data generation unit 34 to overwrite the common data recording unit 34A as a new initial matrix.

The common data generation unit 34 is capable of sequentially generating common data as described above.

At this point, the common data generation unit 34 according to the present embodiment first generates an appropriate number of common data, wherein the appropriate number has been agreed upon between the transmitting communication device 1 and the receiving communication device 1. While it is simplest to set the "appropriate number agreed upon between the transmitting communication device 1 and the receiving communication device 1" so as to be shared among all communication devices 1 and to be fixed, this need not necessarily be the case.

For example, the "number" can alternatively be variably adapted to be determined based on a time where initial common data had been transmitted from the transmitting communication device 1 to the receiving communication device 1, a sum of numbers included in a matrix of initial common data transmitted from the transmitting communication device 1 to the receiving communication device 1, or the like. In addition, for example, by arranging the aforementioned "number" to be determined based on a difference between a sequence created from an electronic mail address of the transmitting communication device 1 and a sequence created from an electronic mail address of the receiving communication device 1 or the like, the "number" is to vary depending on a combination of the transmitting communication device 1 and the receiving communication device 1. While the above is merely exemplary, it is obvious that the aforementioned "number" may alternatively be adapted to be determined based on a combination of the above.

For the purpose of simplification, it is assumed that the "appropriate number agreed upon between the transmitting communication device 1 and the receiving communication device 1" is to be shared among all communication devices 1 and to be fixed, and that the number is set to 10.

After reading initial common data recorded in the common data recording unit 34A, ten pieces of common data are generated, and the initial common data recorded in the common data recording unit 34A is overwritten by the piece of common data last generated. Moreover, "the piece of common data last generated" may exist in plurality if a plurality of pieces of common data is required to generate subsequent common data. In the present embodiment, since common data is generated using the expression Nth common data $(X_N)=X_{N-1}X_{N-2}(+\alpha)$, a piece of common data generated ninth and a piece of common data generated tenth after reading the initial common data recorded in the common data recording unit 34A are to be recorded in the common data recording unit 34A. The pieces of common data are to be the new initial common data.

Using the new initial common data, the common data generation unit 34 generates new common data using the same method as described above. However, the common data generation unit 34 may arrange for an expression to be used when generating common data using the new initial common data so as to differ from the expression that was used when generating the new initial common data. In this case, the agreement must be shared between the transmitting communication device 1 and the receiving communication device 1.

The common data generation unit 34 sends common data that is sequentially generated based on the new initial solution to the algorithm generation unit 35 and the key generation unit 36.

Upon accepting the common data from the common data generation unit 34, the algorithm generation unit 35 generates an algorithm and the key generation unit 36 generates a key.

An example of a method of generating an algorithm and a key is as described below. In the present embodiment, both algorithms and keys are created using common data.

In the present embodiment, the algorithm generation unit 35 generates an algorithm in the following manner.

An algorithm according to the present embodiment is defined as "if common data to be encrypted is assumed to be an 8 row-8 column matrix Y, then a matrix resulting from raising an 8 row-8 column matrix X that is common data to the a-th power and rotating the same clockwise by n×90 degrees is multiplied by Y to obtain encrypted data".

While a predetermined fixed constant may sometimes be set as a, in the present embodiment, a is a number that varies based on common data. In other words, an algorithm according to the present embodiment varies depending on common data. For example, a may be defined as a remainder of a division of a number obtained by adding up all numbers that are matrix elements included in common data that is an 8 row-8 column matrix by 5 (however, if the remainder is 0 then a=1).

In addition, the aforementioned n is a key and is a predetermined number. n is to be fixed if the number of keys is constant. However, as will be described below, the key is to vary depending on common data in the present embodiment. In other words, this n according to the present embodiment also varies depending on common data.

However, an algorithm can also be determined as being something else. In addition, an algorithm may also be set not to vary, or in other words, an algorithm may be fixed. In addition to newly creating an algorithm in the manner described above, the generation of an algorithm also includes a case where, using common data (for example, by focusing on a part of common data), one algorithm is selected from a plurality of algorithms prepared in advance.

In the present embodiment, the algorithm generation unit 35 generates an algorithm each time common data is received from the common data generation unit 34 and sends the algorithm to the encryption unit 33A of the encryption/decryption unit 33.

On the other hand, the key generation unit 36 generates a key in parallel with the generation of an algorithm by the algorithm generation unit 35. As described above, the key generation unit 36 generates a key based on common data. In addition to newly creating a key in the manner described below, the generation of a key also includes a case where, using common data (for example, by focusing on a part of common data), one key is selected from a plurality of keys prepared in advance.

In the present embodiment, the key generation unit 36 generates a key in the following manner.

A key according to the present embodiment is assumed to be a number obtained by adding up all numbers that are matrix elements included in common data that is an 8 row-8 column matrix. Therefore, a key according to the present embodiment varies depending on common data. A key can also be determined as being another entity. For example, a key can be defined as being the lower two digits of a number obtained by adding up all numbers that are matrix elements included in common data that is an 8 row-8 column matrix.

In the present embodiment, the key generation unit 36 generates a key each time common data is received from the common data generation unit 34 and sends the key to the encryption unit 33A of the encryption/decryption unit 33.

The encryption unit 33A encrypts data accepted from the pre-processing unit 32 based on the algorithm accepted from the algorithm generation unit 35 and the key accepted from the key generation unit 36. As described above, packets created by dividing electronic mail data are to be encrypted at this point.

As described above, an algorithm is defined as "if common data to be encrypted is assumed to be an 8 row-8 column matrix Y, then a matrix resulting from raising an 8 row-8 column matrix X that is common data to the a-th power and rotating the same clockwise by n×90 degrees is multiplied by Y to obtain encrypted data", and n that is a key is a number determined by the method such as described above.

For example, if a is 3 and n is 6, then encryption is performed by multiplying an 8 row-8 column matrix, which is obtained by rotating an 8 row-8 column matrix obtained by raising X to the 3rd power by 6×90 degrees=540 degrees, by common data to be encrypted.

The generated data is encrypted data.

The encrypted data is sent to the connection unit 39.

Each time encrypted data is generated, the header generation unit 38 generates header data that is data to become a header of encrypted data. A header includes information such as described above. A header includes at least information for identifying which of the communication devices 1 is the communication source of the packet and information for identifying which of the communication devices 1 is the communication destination of the packet. Moreover, in order to conform the number of pieces of encrypted data generated by the encryption unit 33A to the number of pieces of header data generated by the header generation unit 38, for example, the encryption unit 33A need only notify the header generation unit 38 that encryption of a packet has been performed every time the encryption unit 33A encrypts a packet or notify the number of encryptions performed by the encryption unit 33A. Otherwise, the pre-processing unit 32 may notify the header generation unit 38 of the number of generated packets.

The header generation unit 38 sends the generated headers to the connection unit 39.

The connection unit 39 connects a header accepted from the header generation unit 38 to the head of encrypted data (encrypted packet) received from the encryption unit 33A. The connection unit 39 performs this process on all packets.

Packets to which headers have been connected are sent from the connection unit 39 to the communication unit 37.

The communication unit 37 sends the packets to the receiving communication device 1 via the network 3. Each packet is to be sent to the proper communication device 1 based on the information written in the header.

As described above, initial common data is sent from the transmitting communication device 1 to the receiving communication device 1. The sent initial common data is to be received by the receiving communication device 1 (S201).

As described above, encrypted electronic mail data is packetized and sent from the transmitting communication device 1 to the receiving communication device 1. The sent electronic mail data is to be received by the receiving communication device 1 (S202).

Both the initial common data and the electronic mail data are received by the communication unit 37 included in the encrypted communication unit 27 of the receiving communication device 1.

Next, the receiving communication device 1 decrypts the electronic mail data (S203).

The decryption is performed by the encrypted communication unit 27.

The communication unit 37 sends received packets to the pre-processing unit 32 one after another. Upon receiving the packets, the pre-processing unit 32 deletes the header from each packet and sends a notification to the common data generation unit 34 to the effect that packets have been received.

Upon receiving a notification from the pre-processing unit 32 to the effect that packets have been received, the common data generation unit 34 generates common data.

The method of generating common data at the common data generation unit 34 is the same as during transmission described above. That is, in the present embodiment, common data is generated using initial common data and environmental information.

The initial common data used by the common data generation unit 34 is sent from the transmitting communication device 1. The initial common data is recorded in the common data recording unit 34A via the common data generation unit 34 from the communication unit 37 having received the initial common data from the transmitting communication device 1.

As done so by the common data generation unit 34 of the transmitting communication device 1, the common data generation unit 34 of the receiving communication device 1 generates, based on initial common data received from the transmitting communication device 1, a predetermined number (10) of pieces of common data agreed upon in advance between the transmitting communication device 1 and the receiving communication device 1, and records the generated common data in the common data recording unit 34A. Subsequently, the common data recording unit 34A sets the 9th and 10th pieces of common data last generated as new initial common data, and consecutively generates common data based on the new initial common data.

The common data generated based on the new initial common data is sent from the common data generation unit 34 to the algorithm generation unit 35 and the key generation unit 36.

The algorithm generation unit 35 and the key generation unit 36 generate an algorithm and a key every time common data is accepted from the common data generation unit 34. The method of generating an algorithm and a key is the same as during transmission.

The algorithm generation unit 35 uses common data when generating an algorithm. A process in which the algorithm generation unit 35 of the receiving communication device 1 generates an algorithm is the same as the process in which the algorithm generation unit 35 of the transmitting communication device 1 generates an algorithm. Since algorithms generated in the same order by the transmitting communication device 1 and the receiving communication device 1 are generated using the same common data, the algorithms are to be always the same.

On the other hand, the key generation unit 36 uses common data when generating a key. A process in which the key generation unit 36 of the receiving communication device 1 generates a key is the same as the process in which the key generation unit 36 of the transmitting communication device 1 generates a key. Since keys generated in the same order by the transmitting communication device 1 and the receiving communication device 1 are generated using the same common data, the keys are to be always the same.

The algorithm generation unit 35 and the key generation unit 36 send the generated algorithm or key to the decryption unit 33B of the encryption/decryption unit 33.

The decryption unit 33B decrypts the encrypted data received from the pre-processing unit 32. When performing the decryption, the decryption unit 33B uses the algorithm and the key received from the algorithm generation unit 35 and the key generation unit 36.

More specifically, based on the algorithm (a definition expressed as "if common data to be encrypted is assumed to be an 8 row-8 column matrix Y, then a matrix resulting from raising an 8 row-8 column matrix X that is common data to the a-th power and rotating the same clockwise by n×90 degrees is multiplied by Y to obtain encrypted data") accepted from the algorithm generation unit 35, the decryption unit 33B generates an algorithm for performing decryption (a definition expressed as "if encrypted data is assumed to be an 8 row-8 column matrix Z, then an inverse matrix of a matrix resulting from raising an 8 row-8 column matrix X that is common data to the a-th power and rotating the same clockwise by n×90 degrees is multiplied by Y to obtain plain text data prior to encryption"), and performs decryption by performing a computation according to the above definition using the key received from the key generation unit 36.

In this manner, the decryption unit 33B sequentially decrypts encrypted data sent from the pre-processing unit 32 and decrypts electronic mail data divided into packets.

The decryption unit 33B sends the decrypted electronic mail data in one lump to the interface unit 31. The data is recorded as necessary onto the HDD 22, the RAM 24, and the like, and is appropriately used by the receiving communication device 1.

<Modification>

In the first embodiment, initial common data is transmitted from the transmitting communication device 1 to the receiving communication device 1.

However, initial common data may also be adapted to be sent from the receiving communication device 1 to the transmitting communication device 1.

In this case, for example, prior to electronic mail data being sent from the transmitting communication device 1 to the receiving communication device 1, a reception request that requests reception of an electronic mail is sent from the transmitting communication device 1 to the receiving communication device 1. Subsequently, the receiving communication device 1 having received the reception request sends the initial common data recorded in the common data recording unit 34A of the receiving communication device 1 to the transmitting communication device 1 via the common data generation unit 34, the communication unit 37, and the network 3. Due to such an arrangement, the transmitting communication device 1 and the receiving communication device 1 are able to share initial common data.

The transmitting-side common data generation unit 34 and the receiving-side common data generation unit 34 need only generate new initial common data based on the received or transmitted initial common data and generate common data to be used for encryption or decryption based on the new initial common data.

Second Embodiment

A communication system according to a second embodiment will be described.

The communication system according to the second embodiment includes communication devices 1-1 to 1-N configured in approximately the same manner as in the first embodiment, and an authentication device 2. The devices are adapted to be capable of connecting to each other through a network 3.

The communication devices 1-1 to 1-N according to the second embodiment are adapted to be capable of performing encrypted communication with each other in the same manner as in the first embodiment. In addition, the communication devices 1-1 to 1-N according to the second embodiment are also adapted to be capable of connecting to the authentication device 2. As for communication between the communication device 1 and the authentication device 2, as will be described later, data transmission from the communication device 1 to the authentication device 2 is arranged to be performed in plain text while data transmission from the authentication device 2 to the communication device 1 is arranged to be encrypted communication. Moreover, communication between the authentication device 2 and the communication device 1 in the present embodiment is to be carried out via a general-purpose Internet browser.

In the second embodiment, the authentication device 2 is adapted to authenticate the communication devices 1-1 to 1-N and to transmit data such as data of contents of a moving image to those authenticated as being appropriate among the communication devices 1-1 to 1-N.

The communication device 1 according to the second embodiment is configured the same as the communication device 1 according to the first embodiment. However, initial common data recorded in respective common data recording units 34A of the communication devices 1-1 to 1-N according to the second embodiment is adapted to be unique to each other.

Fundamental portions of the authentication device 2 is configured the same as those of the communication device 1 according to the first embodiment.

Next, a configuration of the authentication device 2 will be described. While not limited thereto, the authentication device 2 in the present embodiment is constituted by a general-purpose computer. Moreover, in light of known techniques, it is obvious that the authentication device 2 can be provided divided into two or more devices such as a transmission server that transmits content data, to be described later, and an authentication server that performs authentication, to be described later.

Figure 7:
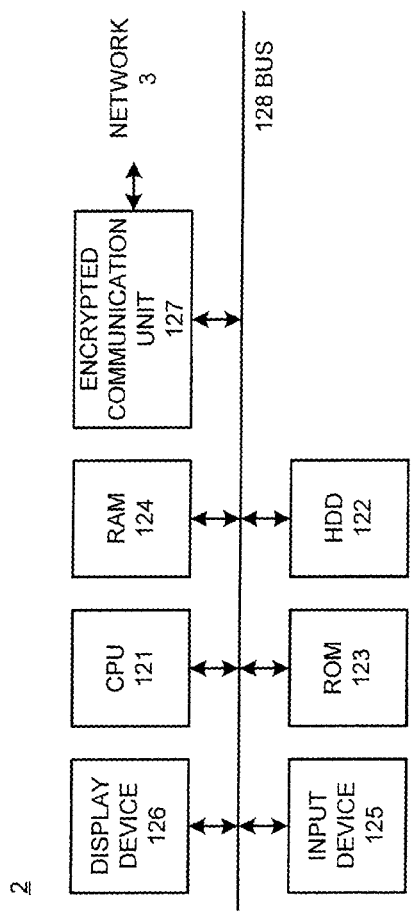
FIG. 7 is a diagram illustrating a hardware configuration of an authentication device included in the transmission/reception system illustrated in FIG. 6.

FIG. 7 illustrates a hardware configuration of the authentication device 2.

In the present embodiment, the authentication device 2 includes a CPU 121, an HDD 122, a ROM 123, a RAM 124, an input device 125, a display device 126, an encrypted communication unit 127, and a bus 128. The CPU 121, the HDD 122, the ROM 123, the RAM 124, the input device 125, the display device 126, and the encrypted communication unit 127 are adapted to be capable of exchanging data via the bus 128.

Functions of the CPU 121, the HDD 122, the ROM 123, the RAM 124, the input device 125, the display device 126, the encrypted communication unit 127, and the bus 128 are approximately the same as the functions of the CPU 21, the HDD 22, the ROM 23, the RAM 24, the input device 25, the display device 26, the encrypted communication unit 27, and the bus 28 of the communication device 1. Moreover, the aforementioned content data is recorded on the HDD 122 according to the second embodiment.

Recorded in the ROM 123 are predetermined programs, and data and the like necessary for executing the programs.

The programs include a program that provides the authentication device 2 with the functions of the authentication device according to the present invention. The programs also include a program for realizing the browser described above. Including the programs described above, the programs retained by the authentication device 2 may be executed independently in some cases and executed in cooperation with another program such as an OS in others.

The CPU 121 performs overall control of the authentication device 2 and executes the processing described later based on the programs or data recorded in the ROM 123. The RAM 124 is used as a work storage area when the CPU 121 performs processing to be described later. In addition, the RAM 124 is adapted such that the initial solutions, to be described later, are recorded as needed.

A known input device such as a keyboard and a mouse may be used as the input device 125. The input device 125 is to be used when inputting an initial solution or the like. The display device 126 is constituted by, for example, an LCD. However, the input device 125 and the display device 126 are not necessarily used during an implementation of the invention of the method according to the present application.

The encrypted communication unit 127 performs communication with the communication device 1 via the network 3. In the present application, as described above, the communication to be performed between the encrypted communication unit 127 and the communication device 1 is encrypted communication.

Figure 8:
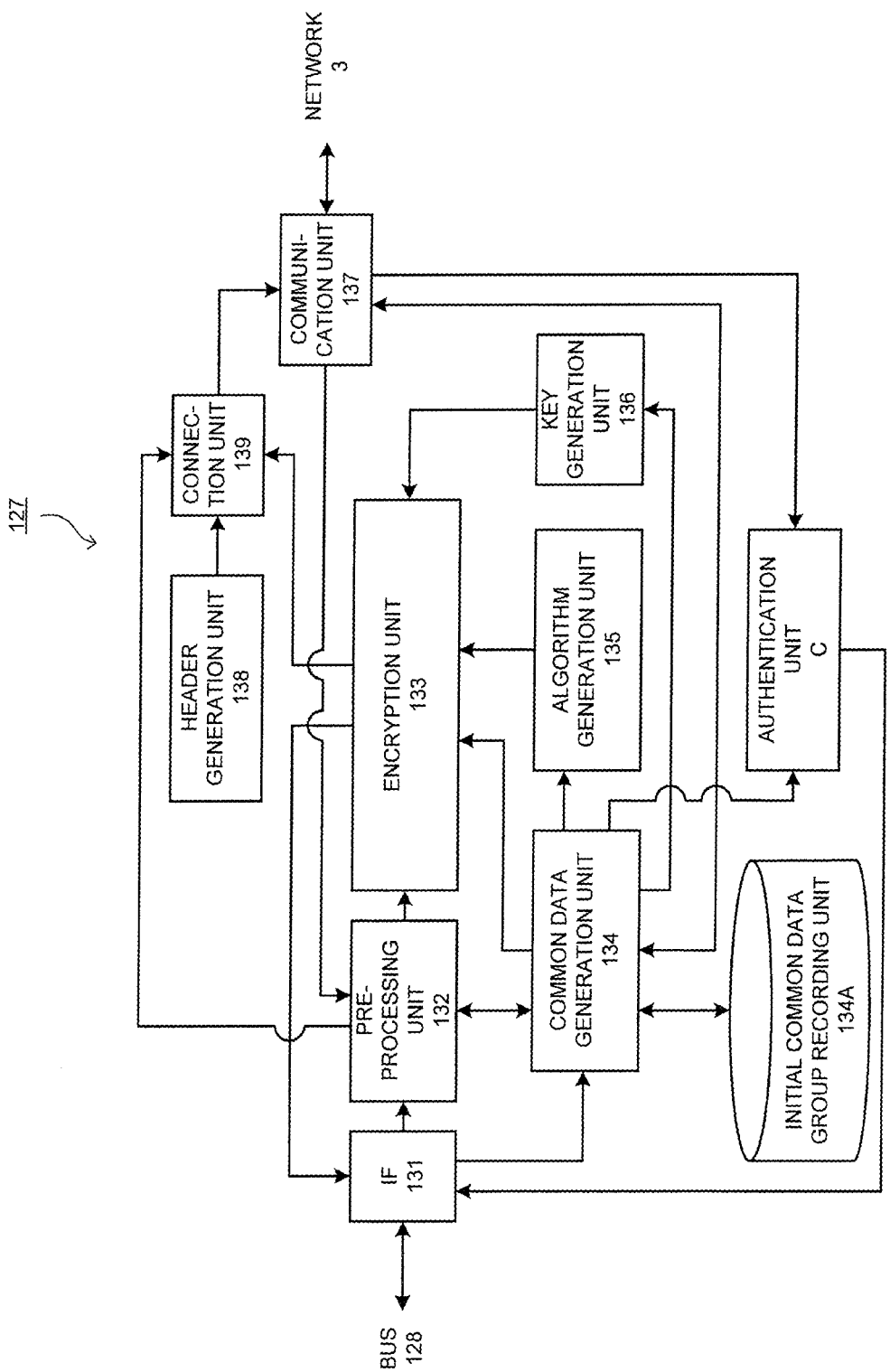
FIG. 8 is a block diagram illustrating a configuration of an encrypted communication unit of the authentication device included in the transmission/reception system illustrated in FIG. 6.
Figure 10:
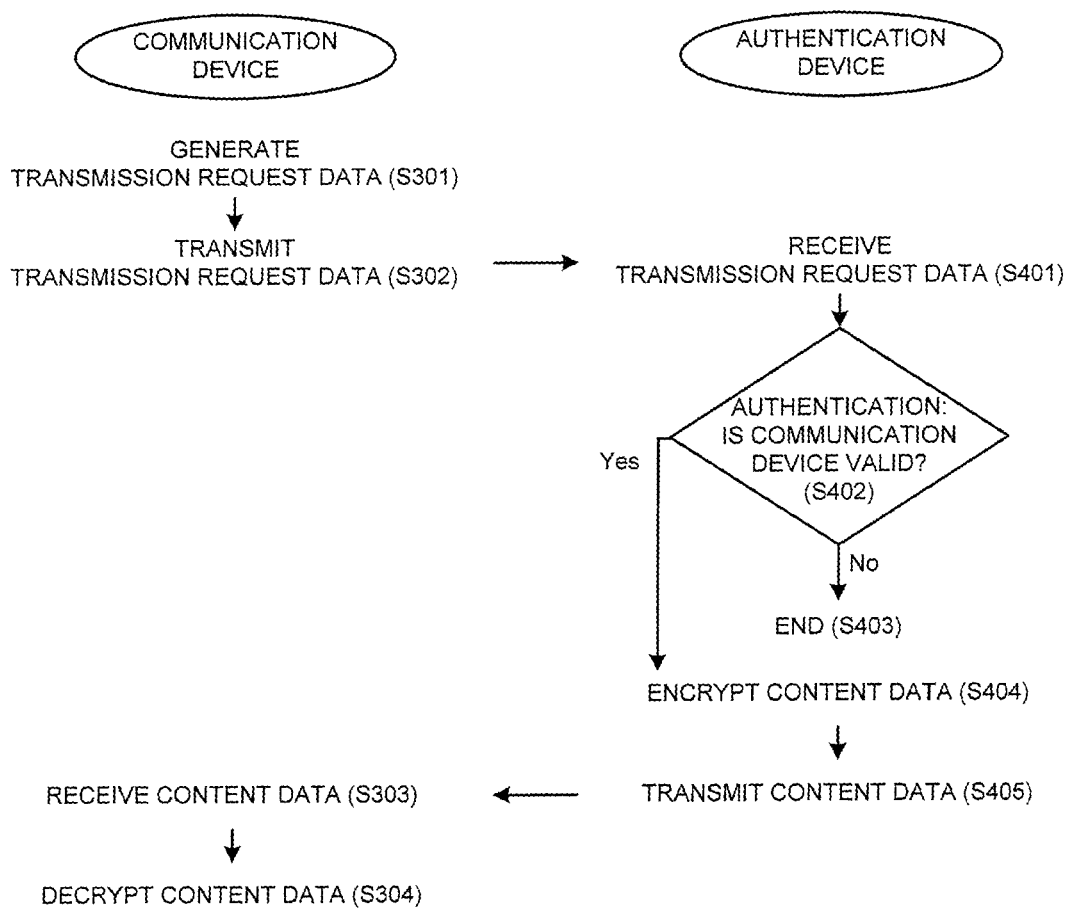
FIG. 10 is a flow chart illustrating a flow of processing executed during transmission in the transmission/reception system illustrated in FIG. 6.

Next, a configuration of the encrypted communication unit 127 will be described. FIG. 8 illustrates a block configuration diagram of the encrypted communication unit 127.

It should be noted that the term "during transmission" as used in the following description signifies a case where data is transmitted from the authentication device 2 to the communication device 1 and primarily means during transmission of content data. In addition, the term "during reception" as used in the following description signifies a case where data is received by the authentication device 2 from the communication device 1 and means during reception of an ID that is information for identifying the communication device 1 and initial common data.

The encrypted communication unit 127 includes an interface unit 131, a pre-processing unit 132, an encryption unit 133, a common data generation unit 134, an initial common data group recording unit 134A, an algorithm generation unit 135, a key generation unit 136, a communication unit 137, a header generation unit 138, a connection unit 139, and an authentication unit C. The interface unit 131, the pre-processing unit 132, the encryption unit 133, the common data generation unit 134, the algorithm generation unit 135, the key generation unit 136, the communication unit 137, the header generation unit 138, and the connection unit 139 have approximately the same functions as the interface unit 31, the pre-processing unit 32, the encryption/decryption unit 33, the common data generation unit 34, the algorithm generation unit 35, the key generation unit 36, the communication unit 37, the header generation unit 38, and the connection unit 39 of the communication device 1.

The interface unit 131 exchanges data between the bus 128 and the encrypted communication unit 127.

During transmission, the interface unit 131 functions as follows. The interface unit 131 is adapted to send data accepted from the bus 128 (in the present embodiment, content data) to the pre-processing unit 132. In addition, the interface unit 131 is adapted such that when accepting content data from the bus 128, the interface unit 131 notifies that content data has been accepted to the common data generation unit 134.

On the other hand, the interface unit 131 performs no particular function during reception.

During transmission, the pre-processing unit 132 is adapted to divide content data received from the bus 128 via the interface unit 131 into pieces having a predetermined number of bits to create packets. The pre-processing unit 132 is adapted to send the generated packets to the encryption unit 133.

During reception, when the pre-processing unit 132 accepts communication request data, to be described later, from the communication device 1, the pre-processing unit 132 is adapted to extract an ID from the communication request data and send the ID to the common data generation unit 134.

The common data generation unit 134 consecutively generates common data using the same method as the common data generation unit 34 of the communication device 1. By using the same initial common data, common data generated by the common data generation unit 134 becomes the same as those generated by the common data generation unit 34 of the communication device 1. The common data generation unit 134 commences generation of common data upon receiving a notification to the effect that content data has been received from the interface unit 131 during transmission, and upon receiving a notification to the effect that content data has been received from the pre-processing unit 132 during reception.

During transmission, the generated common data is to be sent to the pre-processing unit 132, the encryption unit 133, the algorithm generation unit 135, and the key generation unit 136. During reception, the common data is to be sent to the authentication unit C.

When generating common data, initial common data which is unique to each communication device 1 and which is recorded in the initial common data group recording unit 134A is to be used. A unique ID allocated to each communication device 1 and initial common data are recorded in the initial common data group recording unit 134A in a state where, for example, the ID and the initial common data are connected to each other as illustrated in FIG. 9. Moreover, while initial common data of each communication device 1 is to be updated according to a method described later, management of the initial common data is to be performed by the common data generation unit 134.

During transmission, the encryption unit 133 encrypts content data accepted from the common data generation unit 134 to create encrypted data. The encryption unit 133 performs no particular function during reception. The encryption unit 133 can be considered as being the encryption/decryption unit 33 of the communication device 1 but without the function of the decryption unit 33B.

Encrypted data generated by encryption by the encryption unit 133 is to be sent to the connection unit 139.

When performing encryption, the encryption unit 133 uses an algorithm and a key. The algorithm and the key are to be supplied to the encryption unit 133 from the algorithm generation unit 135 and the key generation unit 136.

The algorithm generation unit 135 generates an algorithm based on common data accepted from the common data generation unit 134. The generated algorithm is to be sent from the algorithm generation unit 135 to the encryption unit 133.

The key generation unit 136 generates a key based on common data accepted from the common data generation unit 134. The generated key is to be sent from the key generation unit 136 to the encryption unit 133.

While not necessarily limited thereto, in the present embodiment, both the algorithm generation unit 135 and the key generation unit 136 are to generate an algorithm or a key each time common data is accepted from the common data generation unit 134.

The header generation unit 138 functions only during transmission to generate data of headers to be attached to each packet encrypted by the encryption unit 133 and changed into encrypted data. A header includes, for example, information on a communication source, information on a communication destination, the amount of data included in the packet to which the header is attached, and other generally necessary information. The header generation unit 138 is adapted to send generated header data to the connection unit 139. The connection unit 139 functions only during transmission to integrate a header generated by the header generation unit 138 to an encrypted packet (for example, to a head of the packet) sent from the encryption unit 133.

The communication unit 137 handles data exchange with the network 3.

During transmission, the communication unit 137 accepts data that is a sequence of header-attached packets from the connection unit 139 and sends the data to the communication device 1 via the network 3.

During reception, the communication unit 137 accepts transmission request data including an ID and initial common data from the communication device 1 via the network 3. While the transmission request data is sent from the communication unit 137 to the pre-processing unit 132, initial common data included in the transmission request data is sent to the authentication unit C.

Next, a flow of processing executed by the transmission/reception system will be described with reference to FIG. 9.

Since the communication performed among the communication devices 1-1 to 1-N is the same as in the first embodiment, a description thereof will be omitted. Thus, the flow of processing executed by the transmission/reception system will be described by focusing on the communication between the communication device 1 and the authentication device 2.

Although the communication between the communication device 1 and the authentication device 2 is executed as transmission of content data from the authentication device 2 to the communication device 1, authentication of the communication device 1 by the authentication device 2 is to be performed prior to the transmission of content data.

A specific processing flow is as follows.

First, transmission request data is generated by the communication device 1 (S301). The transmission request data includes contents requesting transmission of content data to the authentication device 2, an ID of the communication device 1, and initial common data recorded in the common data recording unit 34A of the communication device 1.

Specifically, a user having the communication device 1 generates transmission request data by operating the input device 25 of the user's own communication device 1 to, for example, use a general-purpose browser so as to access the authentication device 2 and input the user's own ID on a screen. At this point, for example, according to an instruction from the CPU 21, the common data generation unit 34 reads initial common data from the common data recording unit 34A and sends the initial common data to the communication unit 37 to have the initial common data be included in transmission request data. The transmission request data into which the initial common data is included by the communication unit 37 is sent to the authentication device 2 via the network 3 (S302).

The transmission request data transmitted from the communication device 1 is received by the authentication device 2 via the network 3 (S401). Specifically, the authentication device 2 receives the transmission request data at the communication unit 137 included in the encrypted communication unit 127 thereof.

The authentication device 2 having received the transmission request data authenticates the communication device 1 having transmitted the transmission request data (S402).

Authentication is performed as follows.

The transmission request data received by the communication unit 137 is sent to the pre-processing unit 132. In addition, the communication unit 137 sends the initial common data included in the transmission request data to the authentication unit C.

The pre-processing unit 132 reads ID data from the transmission request data and sends the ID data to the common data generation unit 134. The common data generation unit 134 reads the initial common data connected to the ID from the initial common data group recording unit 134A, and sends the initial common data to the authentication unit C.

When the communication device 1 having sent the transmission request data had not communicated with another communication device 1 prior to the present authentication and has not been authenticated by the authentication device 2 prior to the present authentication, the initial common data sent from the communication device 1 and the initial common data recorded in the initial common data group recording unit 134A of the authentication device 2 are both initial-state initial common data and are consistent with each other. When the initial common data sent from the communication device 1 and the initial common data recorded in the initial common data group recording unit 134A of the authentication device 2 are consistent with each other as described above, the authentication unit C judges that the communication device 1 having sent the transmission request data is valid.

When the communication device 1 having sent the transmission request data had not communicated with another communication device 1 prior to the present authentication but has been authenticated by the authentication device 2 prior to the present authentication, since the initial common data recorded in the common data recording unit 34A of the communication device 1 and the initial common data recorded in the initial common data group recording unit 134A of the authentication device 2 have both been updated according a method such as described below (which is ultimately the same as the method described in the first embodiment) by the same common data generated afterwards, the initial common data sent from the communication device 1 and the initial common data recorded in the initial common data group recording unit 134A of the authentication device 2 become consistent with each other. Similarly, in this case, the authentication unit C judges that the communication device 1 having sent the transmission request data is valid.

The same applies to a case where the communication device 1 having sent the transmission request data had communicated with another communication device 1 prior to the present authentication but has been authenticated by the authentication device 2 prior to the present authentication and has not communicated with another communication device 1 after the prior authentication.

When the communication device 1 having sent the transmission request data has not been previously authenticated by the authentication device 2 and had communicated with another communication device 1 prior to the present authentication, or when the communication device 1 had communicated with another communication device 1 prior to the present authentication and has not been subsequently authenticated by the authentication device 2, since the number or pieces of common data generated by the common data generation unit 34 of the communication device 1 is greater than the number of pieces of common data generated by the common data generation unit 134 of the authentication device 2, initial common data of the common data generation unit 34 of the communication device 1 is in a state of being overwritten by common data to be generated in the future (common data not yet generated) by the common data generation unit 134 of the authentication device 2. In other words, the initial common data sent from the communication device 1 is not consistent with the initial common data recorded in the initial common data group recording unit 134A of the authentication device 2. In this case, the authentication unit C causes the common data generation unit 134 to generate a next piece of common data based on the initial common data sent to the authentication unit C. The common data generation unit 134 sends the generated next piece of common data to the authentication unit C. When the next piece of common data generated by the common data generation unit 134 is consistent with the initial common data sent from the communication device 1, the authentication unit C judges that the communication device 1 having sent the transmission request data is valid. When the next piece of common data generated by the common data generation unit 134 is not consistent with the initial common data sent from the communication device 1, the authentication unit C causes the common data generation unit 134 to generate a next piece of common data based on the initial common data sent to the authentication unit C, and repeats the processing described above. As already described, the common data generation unit 34 of the communication device 1 and the common data generation unit 134 of the authentication device 2 are able to generate the same common data when the same initial common data is used. Therefore, unless the communication device 1 is not a spoof by a third party and as long as the initial common data sent from the communication device 1 had been generated from initial common data connected to the ID allocated to the communication device 1, the same initial common data as the initial common data sent from the communication device 1 is to be eventually supplied from the common data generation unit 134 to the authentication unit C. The authentication unit C judges a validity of the communication device 1 according to such logic. Moreover, the aforementioned method is somewhat problematic with respect to at what stage the authentication unit C causes the common data generation unit 134 to suspend the generation of new common data and at what stage the authentication unit C judges that communication device 1 having sent the transmission request data is not valid. This problem can be solved by, for example, determining, in advance, the number of times the authentication unit C causes the common data generation unit 134 to generate new common data. While the greater the number of times, the more likely that a valid communication device 1 is to be correctly judged as being valid, the number of times can be appropriately determined according to a data processing capacity of the authentication device 2 or the like.

As a result of authentication performed as described above, when the communication device 1 having sent the transmission request data is determined to be invalid (S402: No), the authentication unit C notifies the CPU 121 to that effect via the interface unit 131. The CPU 121 terminates processing upon receiving the notification (S403). In this case, transmission of content data to the communication device 1 having sent the transmission request data is not performed.

When the communication device 1 having sent the transmission request data is determined to be valid (S402: Yes), encryption of the content is commenced (S404).

Specifically, upon receiving the transmission request data from the pre-processing unit 132 via the interface unit 131 and receiving data from the authentication unit C indicating that the communication device 1 having sent the transmission request data is valid, the CPU 121 sends content data recorded in the HDD 122 to the encrypted communication unit 127.

The content data sent to the encrypted communication unit 127 is encrypted by the encrypted communication unit 127 according to the same method that is used when encrypting electronic mail data in the first embodiment, and is transmitted in a packetized state to the communication device 1 having sent the transmission request data according to the same method that is used in the first embodiment (S405).

The initial common data that is used to generate initial common data to be used to encrypt content data to be sent to the communication device 1 having sent the transmission request data is the initial common data sent from the communication device 1 having sent the transmission request data. After the communication device 1 having sent the transmission request data is judged to be valid through authentication, the common data generation unit 134 updates the initial common data connected to the ID sent together with the initial common data that had been recorded in the initial common data group recording unit 134A with the initial common data sent from the communication device 1. Subsequent generation of new pieces of initial common data and generation of encrypted data to be used for encryption are to be performed using the initial common data.

The communication device 1 receives the sent encrypted content data (S303), and decrypts the encrypted content data (S304).

The processes of the communication device 1 for receiving content data and for decrypting the content data are to be executed in the same manner as the processes for receiving electronic mail data and decrypting the electronic mail data performed by the receiving communication device 1 according to the first embodiment.

The initial common data used to generate initial common data to be used by the communication device 1 to decrypt content data is the initial common data sent together with transmission request data by the communication device 1 to the authentication device 2.

The decrypted content is recorded in, for example, the HDD 22 to be appropriately used by the communication device 1.

The invention claimed is:

1. A transmission/reception system comprising: an authentication device for transmitting, via a predetermined network, encrypted data created by encrypting transmission object data that is data to become an object of transmission, and authenticating validity of a plurality of user devices; and a plurality of user devices for receiving the encrypted data from the authentication device via the network when the validity of the user devices is authenticated by the authentication device, the authentication device including a processor and memory for implementing:

authenticating-side solution generating means for consecutively generating, based on an initial solution that is predetermined data, solutions dependent on the initial solution and uniquely determined by the initial solution;

encrypting means that uses the solutions generated by the authenticating-side solution generating means to encrypt the transmission object data to create encrypted data;

authenticating-side recording means for recording, in association with each other, an identification (ID) that is information unique to each user device and an initial solution of each user device and which is unique to each user device or a solution created from the initial solution;

authenticating-side communicating means for communicating with the user devices via the network; and authenticating means for judging a validity of the user devices, each of the user devices including:

user-side solution generating means that consecutively generates, based on an initial solution that is predetermined data, solutions dependent on the initial solution and uniquely determined by the initial solution, and adapted to generate the same solutions as the authenticating-side solution generating means if it uses the same initial solution that is used by the authenticating-side solution generating means;

decrypting means that uses the solutions generated by the user-side solution generating means to decrypt the encrypted data that had been encrypted by the authentication device;

user-side recording means for storing the ID of the user device; and user-side communicating means for communicating with the authentication device via the network, wherein the user device is adapted to transmit the ID recorded in the user-side recording means and the initial solution or a solution generated by the user-side solution generating means based on the initial solution to the authentication device when transmission/reception of the encrypted data is performed, the authenticating-side solution generating means of the authentication device is adapted to read the initial solution associated with the same ID as the ID accepted from the user device or a solution generated from the initial solution and generates solution based on the initial solution or the solution, the authenticating means of the authentication device is adapted to judge whether or not the solution generated by the authenticating-side solution generating means is consistent with the solution accepted from the user device, and judge that the user device is valid when the solutions are consistent, and when the authentication device judges that the user device is valid, the authenticating-side solution generating means and the user-side solution generating means are adapted to generate a mutually agreed-upon predetermined number of solutions, and subsequently generate solutions using a last solution among the predetermined number of solutions as a new initial solution, and the encrypting means is adapted to encrypt the transmission object data using the solution generated by the authenticating-side solution generating means based on the new initial solution, and the decrypting means is adapted to decrypt the encrypted data using the solution generated by the user-side solution generating means based on the new initial solution.

2. The transmission/reception system according to claim 1, wherein after the transmission object data is encrypted into encrypted data, a solution that is last used among the solutions used when encrypting the transmission object data is recorded in the authenticating-side recording means, and after the encrypted data is decrypted into transmission object data, a solution that is last used along the solutions used when decrypting the encrypted data is recorded in the user-side recording means.

3. The transmission/reception system according to claim 1, wherein the encrypting means is adapted to divide the transmission object data into pieces having a predetermined bit length to create divisional transmission object data and subsequently sequentially encrypt the respective pieces of divisional transmission object data using different solutions generated by the authenticating-side solution generating means, and the decrypting means is adapted to divide the encrypted data into pieces having a predetermined bit length to create divisional encrypted data and subsequently sequentially decrypt the respective pieces of divisional encrypted data using different solutions generated by the user-side solution generating means.

4. The transmission/reception system according to claim 1, wherein the authentication device is included in the transmission/reception system.

5. The transmission/reception system according to claim 1, wherein the user device is included in the transmission/reception system.

6. A method to be executed by an authentication device that comprises, a transmission/reception system including: an authentication device for transmitting, via a predetermined network, encrypted data created by encrypting transmission object data that is data to become an object of transmission, and authenticating validity of a plurality of user devices; and a plurality of user devices for receiving the encrypted data from the authentication device via the network when the validity of the plurality of user devices is authenticated by the authentication device, in combination with, the user device adapted to include: user-side solution generating means for consecutively generating, based on an initial solution that is predetermined data, solutions dependent on the initial solution and uniquely determined by the initial solution; decrypting means that uses the solutions generated by the user-side solution generating means to decrypt encrypted data that had been encrypted by the authentication device; user-side recording means that records an identification (ID) of the user device; user-side communicating means for communicating with the authentication device via the network; and means for transmitting the ID and the initial solution or a solution generated based on the initial solution to the authentication device when transmission/reception of the encrypted data is performed, the user-side solution generating means being adapted to generate a predetermined number of solutions mutually agreed-upon with the authentication device and to generate a solution by using a last solution among the predetermined number of solutions as a new initial solution, and the decrypting means being adapted to decrypt encrypted data accepted from the authentication device, after the user device is judged to be valid by the authentication device, using a solution generated by the user-side solution generating means using a last solution among the predetermined number of solutions as a new initial solution, wherein, the authentication device includes: authenticating-side recording means that records, in association with each other, the ID that is information unique to each user device and an initial solution of each user device and which is unique to each user device or a solution created from the initial solution; and control means that consecutively generates, based on an initial solution that is predetermined data, solutions dependent on the initial solution and uniquely determined by the initial solution, and for generating the same solutions as the user-side solution generating means if it uses the same initial solution that is used by the user-side solution generating means, the method including processes in which the control means:

receives, from the user device, the ID of the user device and the initial solution or a solution generated based on the initial solution;

reads, from the authenticating-side recording means, the initial solution associated with the same ID as the ID accepted from the user device or a solution generated from the initial solution and generates a solution based on the initial solution or the solution;

judges whether or not the generated solution is consistent with the solution accepted from the user device and, when the solutions are consistent, judges that the user device is valid;

generates, when the user device is judged to be valid, a predetermined number of solutions agreed upon with the user device using the initial solution or a solution generated based on the initial solution received from the user device as an initial solution; and encrypts the transmission object data using a solution generated using a last solution among the predetermined number of solutions as a new initial solution.

7. A method to be executed by a user device that comprises, a transmission/reception system including: an authentication device for transmitting, via a predetermined network, encrypted data created by encrypting transmission object data that is data to become an object of transmission, and authenticating validity of a plurality of user devices; and a plurality of user devices which receive the encrypted data from the authentication device via the network when the validity of the plurality of user devices is authenticated by the authentication device, in combination with the authentication device adapted to include: authenticating-side solution generating means for consecutively generating, based on an initial solution that is predetermined data, solutions dependent on the initial solution and uniquely determined by the initial solution; encrypting means that uses the solutions generated by the authenticating-side solution generating means to encrypt the transmission object data to create encrypted data; authenticating-side recording means that records, in association with each other, an identification (ID) that is information unique to each user device and an initial solution of each user device which is unique to each user device or a solution generated from the initial solution; authenticating-side communicating means for communicating with the user device via the network; authenticating means for authenticating a validity of the user device; and means for accepting the ID and the initial solution or a solution generated based on the initial solution from the user device when transmission/reception of the encrypted data is performed, the authenticating-side solution generating means being adapted to read from the authenticating-side recording means, when the ID and the solution has been accepted, the initial solution associated with a same ID as the ID accepted from the user device or a solution generated from the initial solution and generate a solution based on the initial solution or the solution, the authenticating means being adapted to judge whether or not the solution generated by the authenticating-side solution generating means is consistent with the solution accepted from the user device and, when the solutions are consistent, judge that the user device is valid, the authenticating-side solution generating means being adapted to generate, when the user device is judged to be valid, a predetermined number of solutions agreed upon with the user device and generate a solution using a last solution among the predetermined number of solutions as a new initial solution, and the encrypting means being adapted to encrypt the transmission object data using a solution generated by the authenticating-side solution generating means using a last solution among the predetermined number of solutions as a new initial solution, wherein, the user device includes control means that consecutively generates, based on an initial solution that is predetermined data, solutions dependent on the initial solution and uniquely determined by the initial solution, and for generating the same solutions as the authenticating-side solution generating means if it uses the same initial solution that is used by the authenticating-side solution generating means, the method including processes in which, the control means:

transmits the ID of the user device and the initial solution or a solution generated based on the initial solution to the authentication device;

receives the encrypted data from the authentication device;

generates a predetermined number, which had been agreed upon with the authentication device, of solutions using the initial solution or a solution generated based on the initial solution transmitted to the authentication device as an initial solution; and decrypts the encrypted data using the solution generated using a last solution among the predetermined number of solutions as a new initial solution.

8. A computer program stored in non-transitory storage, the computer program having instructions that cause control means of a transmission device that comprises, a transmission/reception system including: an authentication device for transmitting, via a predetermined network, encrypted data created by encrypting transmission object data that is data to become an object of transmission, and authenticating validity of a plurality of user devices; and a plurality of user devices which receive the encrypted data from the authentication device via the network when the validity of the plurality of user devices is authenticated by the authentication device, in combination with, the user device adapted to include: user-side solution generating means for consecutively generating, based on an initial solution that is predetermined data, solutions dependent on the initial solution and uniquely determined by the initial solution; decrypting means that uses the solutions generated by the user-side solution generating means to decrypt encrypted data that had been encrypted by the authentication device; user-side recording means that records an identification (ID) of the user device; user-side communicating means for communicating with the authentication device via the network; and means for transmitting the ID and the initial solution or a solution generated based on the initial solution to the authentication device when transmission/reception of the encrypted data is performed, the user-side solution generating means being adapted to generate a predetermined number of solutions mutually agreed-upon with the authentication device and to generate a solution by using a last solution among the predetermined number of solutions as a new initial solution, and the decrypting means adapted to decrypt encrypted data accepted from the authentication device, after the user device is judged to be valid by the authentication device, using a solution generated by the user-side solution generating means using a last solution among the predetermined number of solutions as a new initial solution, wherein, the authentication device includes: authenticating-side recording means that records, in association with each other, the ID that is information unique to each user device and an initial solution of each user device and which is unique to each user device or a solution created from the initial solution; and control means that consecutively generates, based on an initial solution that is predetermined data, solutions dependent on the initial solution and uniquely determined by the initial solution, and adapted to generate the same solutions as the user-side solution generating means if it uses the same initial solution that is used by the user-side solution generating means, to execute the processes of:

receiving, from the user device, the ID of the user device and the initial solution or a solution generated based on the initial solution;

reading, from the authenticating-side recording means, the initial solution associated with the same ID as the ID accepted from the user device or a solution generated from the initial solution and generating a solution based on the initial solution or the solution;

judging whether or not the generated solution is consistent with the solution accepted from the user device and, when the solutions are consistent, judging that the user device is valid;

generating, when the user device is judged to be valid, a predetermined number of solutions agreed upon with the user device using the initial solution or a solution generated based on the initial solution received from the user device as an initial solution; and encrypting the transmission object data using a solution generated using a last solution among the predetermined number of solutions as a new initial solution.

9. A computer program stored in non-transitory storage, the computer program having instructions that causes control means of a transmission device that constitutes, a transmission/reception system including: an authentication device which transmits, via a predetermined network, encrypted data created by encrypting transmission object data that is data to become an object of transmission, and authenticating validity of a plurality of user devices; and a plurality of user devices which receive the encrypted data from the authentication device via the network when the validity of the plurality of user devices is authenticated by the authentication device, in combination with, the authentication device adapted to include: authenticating-side solution generating means for consecutively generating, based on an initial solution that is predetermined data, solutions dependent on the initial solution and uniquely determined by the initial solution; encrypting means that uses the solutions generated by the authenticating-side solution generating means to encrypt the transmission object data to create encrypted data; authenticating-side recording means that records, in association with each other, an identification (ID) that is information unique to each user device and an initial solution of each user device which is unique to each user device or a solution generated from the initial solution; authenticating-side communicating means for communicating with the user device via the network; authenticating means for authenticating a validity of the user device; and means for accepting the ID and the initial solution or a solution generated based on the initial solution from the user device when transmission/reception of the encrypted data is performed, the authenticating-side solution generating means being adapted to read from the authenticating-side recording means, when the ID and the solution has been accepted, the initial solution associated with a same ID as the ID accepted from the user device or a solution generated from the initial solution and generate a solution based on the initial solution or the solution, the authenticating means being adapted to judge whether or not the solution generated by the authenticating-side solution generating means is consistent with the solution accepted from the user device and, when the solutions are consistent, judge that the user device is valid, the authenticating-side solution generating means being adapted to generate, when the user device is judged to be valid, a predetermined number of solutions agreed upon with the user device and generate a solution using a last solution among the predetermined number of solutions as a new initial solution, and the encrypting means being adapted to encrypt the transmission object data using a solution generated by the authenticating-side solution generating means using a last solution among the predetermined number of solutions as a new initial solution, wherein, the user device includes the control means that consecutively generates, based on an initial solution that is predetermined data, solutions dependent on the initial solution and uniquely determined by the initial solution, and adapted to generate the same solutions as the authenticating-side solution generating means if it uses the same initial solution that is used by the authenticating-side solution generating means, to execute processes for:

transmitting the ID of the user device and the initial solution or a solution generated based on the initial solution to the authentication device;

receiving the encrypted data from the authentication device;

generating a predetermined number, which had been agreed upon with the authentication device, of solutions using the initial solution or a solution generated based on the initial solution transmitted to the authentication device as an initial solution; and decrypting the encrypted data using the solution generated using the last solution among the predetermined number of solutions as a new initial solution.

* * * * *